(12) United States Patent  
Shiraiwa

(10) Patent No.: US 8,052,528 B2  
(45) Date of Patent: Nov. 8, 2011

(54) GAME PROGRAM AND GAME DEVICE

(75) Inventor: Yusuke Shiraiwa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 673 days.

(21) Appl. No.: 11/543,216

(22) Filed: Oct. 5, 2006

(65) Prior Publication Data

US 2007/0111792 A1 May 17, 2007

(30) Foreign Application Priority Data

Nov. 11, 2005 (JP) ................................. 2005-328149

(51) Int. Cl.
*A63F 13/00* (2006.01)

(52) U.S. Cl. .......................................... 463/42; 463/43

(58) Field of Classification Search .................... 463/42; 455/418; 700/91
See application file for complete search history.

(56) References Cited

U.S. PATENT DOCUMENTS

| | | | | |
|---|---|---|---|---|
| 6,767,287 | B1 * | 7/2004 | Mcquaid et al. | 463/42 |
| 7,491,123 | B2 * | 2/2009 | Smith | 463/35 |
| 2004/0224772 | A1 * | 11/2004 | Canessa et al. | 463/42 |
| 2005/0027382 | A1 * | 2/2005 | Kirmse et al. | 700/91 |
| 2005/0181878 | A1 * | 8/2005 | Danieli et al. | 463/42 |
| 2005/0239550 | A1 * | 10/2005 | Hardisty et al. | 463/42 |
| 2005/0288000 | A1 * | 12/2005 | Harris et al. | 455/418 |

OTHER PUBLICATIONS

Wun-Chul, "Online Game Programming", SOFTBANK Publishing Inc., 1st ed., pp. 218-222 (2005).

* cited by examiner

*Primary Examiner* — Dmitry Suhol  
*Assistant Examiner* — Ankit Doshi  
(74) *Attorney, Agent, or Firm* — Nixon & Vanderhye P.C.

(57) ABSTRACT

A game device regularly transmits communication status information to communication partners thereof, the communication status information indicating whether or not communication between the game device and each of the communication partners is possible. If, when the game device receives from each of the communication partners the communication status information about said each of the communication partners, the communication status information about any of the communication partners indicates a particular game device as being unable to perform communication, the game device updates the communication status information about the game device such that the communication status information about the game device indicates the particular game device as being unable to perform communication. When the communication status information about all of the communication partners indicate a particular game device as being unable to perform communication, the game device ceases communicating with the game device.

21 Claims, 39 Drawing Sheets

Fig. 6

| FRAME COUNTER 23 ||
|---|---|
| USER TERMINAL B | 4 |
| USER TERMINAL C | 310 |
| USER TERMINAL D | 2 |

Fig. 7A

| COMMUNICATION STATUS INFORMATION ABOUT USER TERMINAL 10  22a |
|---|
| USER TERMINAL B |
| USER TERMINAL D |

Fig. 7B

| COMMUNICATION STATUS INFORMATION ABOUT USER TERMINAL 10  22a ||
|---|---|
| USER TERMINAL B | COMMUNICATION POSSIBLE |
| USER TERMINAL C | COMMUNICATION IMPOSSIBLE |
| USER TERMINAL D | COMMUNICATION POSSIBLE |

Fig. 7C

| COMMUNICATION STATUS INFORMATION ABOUT USER TERMINAL 10  22a |
|---|
| USER TERMINAL C |

Fig. 11B

CURRENT FRAME NUMBER : 204

| USER TERMINAL | COMMUNICATION PARTNERS LIST | FRAME COUNTER | COMMUNICATION STATUS INFORMATION ABOUT COMMUNICATION PARTNERS | | | COMMUNICATION STATUS INFORMATION ABOUT USER TERMINAL 10 |
|---|---|---|---|---|---|---|
| USER TERMINAL A | USER TERMINAL B | 2 | USER TERMINAL A | — | USER TERMINAL D | USER TERMINAL B |
| | USER TERMINAL C | 0 | USER TERMINAL A | USER TERMINAL B | USER TERMINAL D | USER TERMINAL C |
| | USER TERMINAL D | 4 | — | USER TERMINAL B | USER TERMINAL C | USER TERMINAL D |
| USER TERMINAL B | USER TERMINAL A | 4 | — | USER TERMINAL B | USER TERMINAL C | USER TERMINAL A |
| | USER TERMINAL C | 4 | USER TERMINAL A | USER TERMINAL B | USER TERMINAL D | USER TERMINAL C |
| | USER TERMINAL D | 2 | USER TERMINAL A | USER TERMINAL B | — | USER TERMINAL D |
| USER TERMINAL C | USER TERMINAL A | 2 | USER TERMINAL A | USER TERMINAL B | USER TERMINAL D | USER TERMINAL A |
| | USER TERMINAL B | 0 | — | USER TERMINAL B | USER TERMINAL D | USER TERMINAL B |
| | USER TERMINAL D | 0 | USER TERMINAL A | — | USER TERMINAL D | USER TERMINAL D |
| USER TERMINAL D | USER TERMINAL A | 0 | USER TERMINAL A | USER TERMINAL B | USER TERMINAL D | USER TERMINAL A |
| | USER TERMINAL B | 4 | USER TERMINAL A | USER TERMINAL B | USER TERMINAL D | USER TERMINAL B |
| | USER TERMINAL C | 2 | USER TERMINAL A | USER TERMINAL B | — | USER TERMINAL C |

Fig. 12B

CURRENT FRAME NUMBER : 500

| USER TERMINAL | COMMUNICATION PARTNERS LIST | FRAME COUNTER | COMMUNICATION STATUS INFORMATION ABOUT COMMUNICATION PARTNERS | | | COMMUNICATION STATUS INFORMATION ABOUT USER TERMINAL 10 |
|---|---|---|---|---|---|---|
| USER TERMINAL A | USER TERMINAL B | 298 | — | USER TERMINAL C | USER TERMINAL D | USER TERMINAL B |
| | USER TERMINAL C | 2 | USER TERMINAL A | USER TERMINAL B | USER TERMINAL D | USER TERMINAL C |
| | USER TERMINAL D | 0 | USER TERMINAL A | USER TERMINAL B | — | USER TERMINAL D |
| USER TERMINAL B | USER TERMINAL A | 300 | — | USER TERMINAL C | USER TERMINAL D | ~~USER TERMINAL A~~ |
| | USER TERMINAL C | 0 | USER TERMINAL A | USER TERMINAL B | USER TERMINAL D | USER TERMINAL C |
| | USER TERMINAL D | 4 | USER TERMINAL A | USER TERMINAL B | — | USER TERMINAL D |
| USER TERMINAL C | USER TERMINAL A | 4 | — | USER TERMINAL B | USER TERMINAL D | USER TERMINAL A |
| | USER TERMINAL B | 2 | USER TERMINAL A | — | USER TERMINAL D | USER TERMINAL B |
| | USER TERMINAL D | 2 | USER TERMINAL A | USER TERMINAL B | — | USER TERMINAL D |
| USER TERMINAL D | USER TERMINAL A | 2 | — | USER TERMINAL B | USER TERMINAL C | USER TERMINAL A |
| | USER TERMINAL B | 0 | USER TERMINAL A | — | USER TERMINAL C | USER TERMINAL B |
| | USER TERMINAL C | 4 | USER TERMINAL A | USER TERMINAL B | — | USER TERMINAL C |

Fig. 13B

CURRENT FRAME NUMBER : 502

| USER TERMINAL | COMMUNICATION PARTNERS LIST | FRAME COUNTER | COMMUNICATION STATUS INFORMATION ABOUT COMMUNICATION PARTNERS | | | COMMUNICATION STATUS INFORMATION ABOUT USER TERMINAL 10 |
|---|---|---|---|---|---|---|
| USER TERMINAL A | USER TERMINAL B | 300 | USER TERMINAL A | — | USER TERMINAL C | USER TERMINAL D | USER TERMINAL B |
| | USER TERMINAL C | 4 | USER TERMINAL A | USER TERMINAL B | — | USER TERMINAL D | USER TERMINAL C |
| | USER TERMINAL D | 2 | USER TERMINAL A | USER TERMINAL B | USER TERMINAL C | — | USER TERMINAL D |
| USER TERMINAL B | USER TERMINAL A | 302 | — | USER TERMINAL B | USER TERMINAL C | USER TERMINAL D | |
| | USER TERMINAL C | 2 | USER TERMINAL A | USER TERMINAL B | — | USER TERMINAL D | USER TERMINAL C |
| | USER TERMINAL D | 0 | USER TERMINAL A | USER TERMINAL B | USER TERMINAL C | — | USER TERMINAL D |
| USER TERMINAL C | USER TERMINAL A | 0 | — | USER TERMINAL B | USER TERMINAL C | USER TERMINAL D | USER TERMINAL A |
| | USER TERMINAL B | 4 | USER TERMINAL A | — | USER TERMINAL C | USER TERMINAL D | USER TERMINAL B |
| | USER TERMINAL D | 4 | USER TERMINAL A | USER TERMINAL B | USER TERMINAL C | — | USER TERMINAL D |
| USER TERMINAL D | USER TERMINAL A | 4 | — | USER TERMINAL B | USER TERMINAL C | USER TERMINAL D | USER TERMINAL A |
| | USER TERMINAL B | 2 | USER TERMINAL A | — | USER TERMINAL C | USER TERMINAL D | USER TERMINAL B |
| | USER TERMINAL C | 0 | USER TERMINAL A | USER TERMINAL B | — | USER TERMINAL D | USER TERMINAL C |

Fig. 14B

CURRENT FRAME NUMBER : 510

| USER TERMINAL | COMMUNICATION PARTNERS LIST | FRAME COUNTER | COMMUNICATION STATUS INFORMATION ABOUT COMMUNICATION PARTNERS | | | COMMUNICATION STATUS INFORMATION ABOUT USER TERMINAL 10 |
|---|---|---|---|---|---|---|
| USER TERMINAL A | USER TERMINAL B | 308 | USER TERMINAL A | — | USER TERMINAL D | |
| | USER TERMINAL C | 0 | USER TERMINAL A | USER TERMINAL B | USER TERMINAL D | USER TERMINAL C |
| | USER TERMINAL D | 4 | USER TERMINAL A | USER TERMINAL B | — | USER TERMINAL D |
| USER TERMINAL B | USER TERMINAL A | 310 | — | USER TERMINAL B | USER TERMINAL D | |
| | USER TERMINAL C | 4 | USER TERMINAL A | USER TERMINAL B | USER TERMINAL D | USER TERMINAL C |
| | USER TERMINAL D | 2 | USER TERMINAL A | USER TERMINAL B | — | USER TERMINAL D |
| USER TERMINAL C | USER TERMINAL A | 2 | — | USER TERMINAL B | USER TERMINAL D | ~~USER TERMINAL A~~ |
| | USER TERMINAL B | 0 | ~~USER TERMINAL A~~ | USER TERMINAL B | USER TERMINAL D | USER TERMINAL B |
| | USER TERMINAL D | 0 | USER TERMINAL A | — | USER TERMINAL D | USER TERMINAL D |
| USER TERMINAL D | USER TERMINAL A | 0 | — | USER TERMINAL B | USER TERMINAL D | USER TERMINAL A |
| | USER TERMINAL B | 4 | USER TERMINAL A | USER TERMINAL B | USER TERMINAL D | USER TERMINAL B |
| | USER TERMINAL C | 2 | USER TERMINAL A | — | USER TERMINAL D | USER TERMINAL C |

Fig. 15B (CURRENT FRAME NUMBER : 512)

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| USER TERMINAL A | USER TERMINAL B | 310 | USER TERMINAL A | — | USER TERMINAL C | USER TERMINAL D | |
| | USER TERMINAL C | 2 | USER TERMINAL A | USER TERMINAL B | — | USER TERMINAL D | USER TERMINAL C |
| | USER TERMINAL D | 0 | USER TERMINAL A | USER TERMINAL B | USER TERMINAL C | — | USER TERMINAL D |
| USER TERMINAL B | USER TERMINAL A | 312 | — | USER TERMINAL B | USER TERMINAL C | USER TERMINAL D | |
| | USER TERMINAL C | 0 | USER TERMINAL A | USER TERMINAL B | — | USER TERMINAL D | USER TERMINAL C |
| | USER TERMINAL D | 4 | USER TERMINAL A | USER TERMINAL B | USER TERMINAL C | — | USER TERMINAL D |
| USER TERMINAL C | USER TERMINAL A | 4 | — | USER TERMINAL B | USER TERMINAL C | USER TERMINAL D | |
| | USER TERMINAL B | 2 | USER TERMINAL A | — | USER TERMINAL C | USER TERMINAL D | USER TERMINAL B |
| | USER TERMINAL D | 2 | USER TERMINAL A | USER TERMINAL B | USER TERMINAL C | — | USER TERMINAL D |
| USER TERMINAL D | USER TERMINAL A | 2 | ~~USER TERMINAL A~~ | USER TERMINAL B | USER TERMINAL C | USER TERMINAL D | ~~USER TERMINAL A~~ |
| | USER TERMINAL B | 0 | USER TERMINAL A | — | USER TERMINAL C | USER TERMINAL D | USER TERMINAL B |
| | USER TERMINAL C | 4 | USER TERMINAL A | USER TERMINAL B | — | USER TERMINAL D | USER TERMINAL C |

Fig. 16B (CURRENT FRAME NUMBER : 514)

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| USER TERMINAL A | USER TERMINAL B | 312 | USER TERMINAL A | — | USER TERMINAL C | USER TERMINAL D | |
| | USER TERMINAL C | 4 | USER TERMINAL A | USER TERMINAL B | — | USER TERMINAL D | USER TERMINAL C |
| | USER TERMINAL D | 2 | USER TERMINAL A | USER TERMINAL B | USER TERMINAL C | — | USER TERMINAL D |
| USER TERMINAL B | USER TERMINAL A | 314 | — | USER TERMINAL B | USER TERMINAL C | USER TERMINAL D | |
| | USER TERMINAL C | 2 | USER TERMINAL A | USER TERMINAL B | — | USER TERMINAL D | USER TERMINAL C |
| | USER TERMINAL D | 0 | USER TERMINAL A | USER TERMINAL B | USER TERMINAL C | — | USER TERMINAL D |
| USER TERMINAL C | USER TERMINAL A | 0 | — | ~~USER TERMINAL B~~ | USER TERMINAL C | USER TERMINAL D | ~~USER TERMINAL B~~ |
| | USER TERMINAL B | 4 | USER TERMINAL A | USER TERMINAL B | — | USER TERMINAL D | USER TERMINAL D |
| | USER TERMINAL D | 4 | USER TERMINAL A | USER TERMINAL B | USER TERMINAL C | — | |
| USER TERMINAL D | USER TERMINAL A | 4 | — | USER TERMINAL B | USER TERMINAL C | USER TERMINAL D | USER TERMINAL B |
| | USER TERMINAL B | 2 | USER TERMINAL A | — | USER TERMINAL C | USER TERMINAL D | |
| | USER TERMINAL C | 0 | USER TERMINAL A | USER TERMINAL B | — | USER TERMINAL D | USER TERMINAL C |

Fig. 17B

CURRENT FRAME NUMBER : 516

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| USER TERMINAL A | USER TERMINAL B | 314 | USER TERMINAL A | — | USER TERMINAL C | USER TERMINAL D | |
| | USER TERMINAL C | 0 | USER TERMINAL A | USER TERMINAL B | — | USER TERMINAL D | USER TERMINAL C |
| | USER TERMINAL D | 4 | USER TERMINAL A | USER TERMINAL B | USER TERMINAL C | — | USER TERMINAL D |
| USER TERMINAL B | USER TERMINAL A | 316 | — | USER TERMINAL B | USER TERMINAL C | USER TERMINAL D | USER TERMINAL C |
| | USER TERMINAL C | 4 | USER TERMINAL A | USER TERMINAL B | — | USER TERMINAL D | USER TERMINAL D |
| | USER TERMINAL D | 2 | USER TERMINAL A | USER TERMINAL B | USER TERMINAL C | — | |
| USER TERMINAL C | USER TERMINAL A | 2 | — | USER TERMINAL B | USER TERMINAL C | USER TERMINAL D | USER TERMINAL C |
| | USER TERMINAL B | 0 | USER TERMINAL A | — | USER TERMINAL C | USER TERMINAL D | USER TERMINAL D |
| | USER TERMINAL D | 0 | USER TERMINAL A | USER TERMINAL B | USER TERMINAL C | — | |
| USER TERMINAL D | USER TERMINAL A | 4 | — | USER TERMINAL B | USER TERMINAL C | USER TERMINAL D | USER TERMINAL D |
| | USER TERMINAL B | (crossed out) | USER TERMINAL A | (crossed out) | USER TERMINAL C | USER TERMINAL D | (crossed out: USER TERMINAL B) |
| | USER TERMINAL C | 2 | USER TERMINAL A | USER TERMINAL B | — | USER TERMINAL D | USER TERMINAL C |

Fig. 18B

CURRENT FRAME NUMBER : 520

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| | | | A | B | C | D | |
| USER TERMINAL A | USER TERMINAL B | 318 | – | – | USER TERMINAL C | USER TERMINAL D | |
| | USER TERMINAL C | 4 | USER TERMINAL A | USER TERMINAL B | – | USER TERMINAL D | USER TERMINAL C |
| | USER TERMINAL D | 2 | USER TERMINAL A | USER TERMINAL B | USER TERMINAL C | – | USER TERMINAL D |
| USER TERMINAL B | USER TERMINAL A | 320 | – | – | USER TERMINAL C | USER TERMINAL D | |
| | USER TERMINAL C | 2 | USER TERMINAL A | USER TERMINAL B | – | USER TERMINAL D | USER TERMINAL C |
| | USER TERMINAL D | 0 | USER TERMINAL A | USER TERMINAL B | USER TERMINAL C | – | USER TERMINAL D |
| USER TERMINAL C | USER TERMINAL A | 0 | – | USER TERMINAL B | USER TERMINAL C | USER TERMINAL D | |
| | USER TERMINAL B | 4 | USER TERMINAL A | – | USER TERMINAL C | USER TERMINAL D | USER TERMINAL C |
| | USER TERMINAL D | 4 | USER TERMINAL A | USER TERMINAL B | USER TERMINAL C | – | USER TERMINAL D |
| USER TERMINAL D | USER TERMINAL A | 4 | – | USER TERMINAL B | USER TERMINAL C | USER TERMINAL D | |
| | USER TERMINAL B | 2 | USER TERMINAL A | – | USER TERMINAL C | USER TERMINAL D | |
| | USER TERMINAL C | 0 | ~~USER TERMINAL A~~ | USER TERMINAL B | – | USER TERMINAL D | USER TERMINAL C |

Fig. 19B

CURRENT FRAME NUMBER : 520

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| USER TERMINAL A | USER TERMINAL B | *318* | USER TERMINAL A | — | USER TERMINAL C | USER TERMINAL D | |
| | USER TERMINAL C | 4 | USER TERMINAL A | USER TERMINAL B | — | USER TERMINAL D | USER TERMINAL C |
| | USER TERMINAL D | 2 | USER TERMINAL A | USER TERMINAL B | USER TERMINAL C | — | USER TERMINAL D |
| USER TERMINAL B | USER TERMINAL A | *320* | — | USER TERMINAL B | USER TERMINAL C | USER TERMINAL D | |
| | USER TERMINAL C | 2 | USER TERMINAL A | USER TERMINAL B | — | USER TERMINAL D | USER TERMINAL C |
| | USER TERMINAL D | 0 | USER TERMINAL A | USER TERMINAL B | USER TERMINAL C | — | USER TERMINAL D |
| USER TERMINAL C | USER TERMINAL A | 0 | — | USER TERMINAL B | USER TERMINAL C | USER TERMINAL D | |
| | USER TERMINAL B | 4 | USER TERMINAL A | — | USER TERMINAL C | USER TERMINAL D | |
| | USER TERMINAL D | 4 | USER TERMINAL A | USER TERMINAL B | USER TERMINAL C | — | USER TERMINAL D |
| USER TERMINAL D | ~~USER TERMINAL A~~ | | | | | | |
| | USER TERMINAL B | 2 | USER TERMINAL A | USER TERMINAL B | — | USER TERMINAL D | |
| | USER TERMINAL C | 0 | | | | | USER TERMINAL C |

Fig. 20B

CURRENT FRAME NUMBER : 522

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| USER TERMINAL A | USER TERMINAL B | 320 | USER TERMINAL A | — | USER TERMINAL C | USER TERMINAL D | |
| | USER TERMINAL C | 0 | ~~USER TERMINAL A~~ | USER TERMINAL B | — | USER TERMINAL D | USER TERMINAL C |
| | USER TERMINAL D | 4 | USER TERMINAL A | USER TERMINAL B | USER TERMINAL C | — | USER TERMINAL D |
| USER TERMINAL B | USER TERMINAL A | 322 | — | USER TERMINAL B | USER TERMINAL C | USER TERMINAL D | |
| | USER TERMINAL C | 4 | USER TERMINAL A | USER TERMINAL B | — | USER TERMINAL D | USER TERMINAL C |
| | USER TERMINAL D | 2 | USER TERMINAL A | USER TERMINAL B | USER TERMINAL C | — | USER TERMINAL D |
| USER TERMINAL C | USER TERMINAL A | 2 | — | — | USER TERMINAL C | USER TERMINAL D | |
| | USER TERMINAL B | 0 | ~~USER TERMINAL A~~ | USER TERMINAL B | USER TERMINAL C | — | USER TERMINAL D |
| | USER TERMINAL D | 0 | | | USER TERMINAL C | — | |
| USER TERMINAL D | USER TERMINAL B | 4 | | — | USER TERMINAL C | USER TERMINAL D | USER TERMINAL D |
| | USER TERMINAL C | 2 | | USER TERMINAL B | — | USER TERMINAL D | USER TERMINAL C |

Fig. 21B

CURRENT FRAME NUMBER : 522

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| USER TERMINAL A | USER TERMINAL B | 320 | USER TERMINAL A | — | USER TERMINAL C | USER TERMINAL D | |
| | USER TERMINAL C | 0 | | USER TERMINAL B | USER TERMINAL C | USER TERMINAL D | USER TERMINAL C |
| | USER TERMINAL D | 4 | USER TERMINAL A | USER TERMINAL B | USER TERMINAL C | — | USER TERMINAL D |
| USER TERMINAL B | USER TERMINAL A | 322 | — | USER TERMINAL B | USER TERMINAL C | USER TERMINAL D | |
| | USER TERMINAL C | 4 | USER TERMINAL A | USER TERMINAL B | — | USER TERMINAL D | USER TERMINAL C |
| | USER TERMINAL D | 2 | USER TERMINAL A | USER TERMINAL B | USER TERMINAL C | — | USER TERMINAL D |
| USER TERMINAL C | ~~USER TERMINAL A~~ | | | | | | |
| | USER TERMINAL B | 0 | | — | USER TERMINAL C | USER TERMINAL D | |
| | USER TERMINAL D | 0 | | USER TERMINAL B | USER TERMINAL C | — | USER TERMINAL C |
| USER TERMINAL D | USER TERMINAL B | 4 | | — | USER TERMINAL C | USER TERMINAL D | |
| | USER TERMINAL C | 2 | | USER TERMINAL B | — | USER TERMINAL D | USER TERMINAL C |

Fig. 22B

CURRENT FRAME NUMBER : 524

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| USER TERMINAL A | USER TERMINAL B | 322 | USER TERMINAL A | — | USER TERMINAL C | USER TERMINAL D | |
| | USER TERMINAL C | 2 | | USER TERMINAL B | USER TERMINAL C | USER TERMINAL D | USER TERMINAL C |
| | USER TERMINAL D | 6 | | USER TERMINAL B | USER TERMINAL C | — | USER TERMINAL D |
| USER TERMINAL B | USER TERMINAL A | 324 | USER TERMINAL A | USER TERMINAL B | USER TERMINAL C | USER TERMINAL D | |
| | USER TERMINAL C | 0 | USER TERMINAL A | USER TERMINAL B | — | USER TERMINAL D | USER TERMINAL C |
| | USER TERMINAL D | 4 | USER TERMINAL A | USER TERMINAL B | USER TERMINAL C | — | USER TERMINAL D |
| USER TERMINAL C | USER TERMINAL B | 2 | | — | USER TERMINAL C | USER TERMINAL D | |
| | USER TERMINAL D | 2 | | USER TERMINAL B | USER TERMINAL C | USER TERMINAL D | USER TERMINAL D |
| USER TERMINAL D | USER TERMINAL B | 0 | | — | USER TERMINAL C | USER TERMINAL D | |
| | USER TERMINAL C | 4 | | USER TERMINAL B | — | USER TERMINAL D | USER TERMINAL C |

Fig. 23B (CURRENT FRAME NUMBER : 526)

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| USER TERMINAL A | USER TERMINAL B | 324 | USER TERMINAL A | — | USER TERMINAL C | USER TERMINAL D | |
| | USER TERMINAL C | 4 | USER TERMINAL A | USER TERMINAL B | — | USER TERMINAL D | USER TERMINAL C |
| | USER TERMINAL D | 8 | USER TERMINAL A | USER TERMINAL B | USER TERMINAL C | — | USER TERMINAL D |
| USER TERMINAL B | USER TERMINAL A | 326 | — | USER TERMINAL B | USER TERMINAL C | USER TERMINAL D | |
| | USER TERMINAL C | 2 | ~~USER TERMINAL A~~ | ~~USER TERMINAL B~~ | USER TERMINAL C | — | USER TERMINAL C |
| | USER TERMINAL D | 0 | USER TERMINAL A | — | USER TERMINAL C | USER TERMINAL D | USER TERMINAL D |
| USER TERMINAL C | USER TERMINAL B | 4 | | USER TERMINAL B | USER TERMINAL C | USER TERMINAL D | |
| | USER TERMINAL D | 4 | | USER TERMINAL B | USER TERMINAL C | USER TERMINAL D | USER TERMINAL D |
| USER TERMINAL D | USER TERMINAL B | 2 | | USER TERMINAL B | — | USER TERMINAL D | |
| | USER TERMINAL C | 0 | | ~~USER TERMINAL B~~ | USER TERMINAL C | USER TERMINAL D | USER TERMINAL C |

Fig. 24B

CURRENT FRAME NUMBER : 526

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| USER TERMINAL A | USER TERMINAL B | 324 | USER TERMINAL A | — | USER TERMINAL C | USER TERMINAL D | |
| | USER TERMINAL C | 4 | USER TERMINAL A | USER TERMINAL B | — | USER TERMINAL D | USER TERMINAL C |
| | USER TERMINAL D | 8 | — | USER TERMINAL B | USER TERMINAL C | USER TERMINAL D | USER TERMINAL D |
| USER TERMINAL B | USER TERMINAL A | 326 | — | USER TERMINAL B | USER TERMINAL C | USER TERMINAL D | |
| | USER TERMINAL C | 2 | | USER TERMINAL B | USER TERMINAL C | USER TERMINAL D | USER TERMINAL C |
| | USER TERMINAL D | 0 | | USER TERMINAL B | USER TERMINAL C | — | USER TERMINAL D |
| USER TERMINAL C | USER TERMINAL B | 4 | | — | USER TERMINAL C | USER TERMINAL D | |
| | USER TERMINAL D | 4 | | USER TERMINAL B | USER TERMINAL C | — | USER TERMINAL D |
| USER TERMINAL D | ~~USER TERMINAL B~~ | | | | | | |
| | USER TERMINAL C | 0 | | | — | USER TERMINAL D | USER TERMINAL C |

Fig. 25B (CURRENT FRAME NUMBER : 528)

| USER TERMINAL | COMMUNICATION PARTNERS LIST | FRAME COUNTER | COMMUNICATION STATUS INFORMATION ABOUT COMMUNICATION PARTNERS ||| COMMUNICATION STATUS INFORMATION ABOUT USER TERMINAL 10 |
|---|---|---|---|---|---|---|
| USER TERMINAL A | USER TERMINAL B | *326* | USER TERMINAL A | – | USER TERMINAL C | USER TERMINAL D |  |
|  | USER TERMINAL C | 6 | USER TERMINAL A | USER TERMINAL B | – | USER TERMINAL D | USER TERMINAL C |
|  | USER TERMINAL D | 10 | USER TERMINAL A | USER TERMINAL B | USER TERMINAL C | – | USER TERMINAL D |
| USER TERMINAL B | USER TERMINAL A | *328* | – | USER TERMINAL B | USER TERMINAL C | USER TERMINAL D |  |
|  | USER TERMINAL C | 4 |  | USER TERMINAL B | – | USER TERMINAL D | USER TERMINAL C |
|  | USER TERMINAL D | 2 |  | USER TERMINAL B | USER TERMINAL C | – | USER TERMINAL D |
| USER TERMINAL C | USER TERMINAL B | 0 |  | USER TERMINAL B | USER TERMINAL C | USER TERMINAL D |  |
|  | USER TERMINAL D | 0 |  | ~~USER TERMINAL B~~ | USER TERMINAL C | – | USER TERMINAL D |
| USER TERMINAL D | USER TERMINAL C | 2 |  |  | USER TERMINAL C | USER TERMINAL D | USER TERMINAL C |

Fig. 26B (CURRENT FRAME NUMBER : 528)

| USER TERMINAL | COMMUNICATION PARTNERS LIST | FRAME COUNTER | COMMUNICATION STATUS INFORMATION ABOUT COMMUNICATION PARTNERS | | | | COMMUNICATION STATUS INFORMATION ABOUT USER TERMINAL 10 |
|---|---|---|---|---|---|---|---|
| USER TERMINAL A | USER TERMINAL B | 326 | USER TERMINAL A | — | USER TERMINAL C | USER TERMINAL D | |
| | USER TERMINAL C | 6 | USER TERMINAL A | USER TERMINAL B | — | USER TERMINAL D | USER TERMINAL C |
| | USER TERMINAL D | 10 | USER TERMINAL A | USER TERMINAL B | USER TERMINAL C | — | USER TERMINAL D |
| USER TERMINAL B | USER TERMINAL A | 328 | — | USER TERMINAL B | USER TERMINAL C | USER TERMINAL D | |
| | USER TERMINAL C | 4 | | USER TERMINAL B | — | USER TERMINAL D | USER TERMINAL C |
| | USER TERMINAL D | 2 | | USER TERMINAL B | USER TERMINAL C | — | USER TERMINAL D |
| USER TERMINAL C | ~~USER TERMINAL B~~ | 0 | | | — | USER TERMINAL D | |
| | USER TERMINAL D | | | | USER TERMINAL C | — | USER TERMINAL D |
| USER TERMINAL D | USER TERMINAL C | 2 | | | — | USER TERMINAL D | USER TERMINAL C |

GAME PROGRAM AND GAME DEVICE

CROSS REFERENCE TO RELATED APPLICATION

The disclosure of Japanese Patent Application No. 2005-328149 is incorporated herein by reference.

TECHNICAL FIELD

The exemplary embodiments disclosed herein relate to a storage medium storing a game program and a game device, and particularly to a storage medium storing a game program and a game device which are used for a game system in which a plurality of game devices transmit and receive game data to and from each other, and each game device performs game processes by using the game data received from the other game devices.

BACKGROUND AND SUMMARY

Network game systems can be roughly categorized into two types, i.e., client/server type network game systems and peer-to-peer network game systems.

In a client/server type network game system, each user terminal is connected to a game server as a client, and the game server mainly performs game processes to execute a game. In the client/server type network game system, the greater the number of user terminals connected to the game server, the greater is the processing load on the game server. For this reason, the game server is required to have high capacity. This leads to a high cost of constructing the network game system, which is a disadvantage of the client/server type.

On the other hand, in a peer-to-peer network game system, basically, a game is executed through communications performed among user terminals. For this reason, a game server having high capacity, which is necessary for the client/server type network game system, is not necessary. In addition, data transfer among the user terminals is not required to be performed via a game server. Therefore, the peer-to-peer network game system is suitable for executing a game requiring real-time processing such as a racing game. An exemplary peer-to-peer network game system is disclosed in a non-patent document 1 (Jung Wun-Chul, "Online Game Programming", SOFTBANK Publishing Inc., Mar. 3, 2005, first edition, pp. 218-222).

Although the above non-patent document 1 discloses a manner of connecting a user terminal to the peer-to-peer network, the non-patent document 1 does not disclose a manner of disconnecting from the network a user terminal whose connection status to the other user terminals in the network is unstable or which is in a state of connection-disabled.

Unlike the client/server type network game system, the peer-to-peer network game system has a feature in which user terminals each individually perform arithmetic processing in accordance with signals received from the other user terminals. For this reason, if, in the game system, each user terminal freely ceases communicating with a user terminal whose connection status to said each user terminal is unstable or which has been unable to communicate with said each user terminal for a predetermined period of time, a status of a game commonly executed by the user terminals is differently displayed on a screen of each of the user terminals. This may cause a significantly negative effect on a progress of the game.

For example, if, in a peer-to-peer network game system comprising four game devices A to D as shown in FIG. 27, a failure occurs on a communication line between the game devices A and B, the game device A continues to perform game processes in accordance with game data of the game device A and game data transmitted from the game devices C and D, since the game device A cannot receive game data from the game device B. In such a case, however, the game device C continues to perform game processes in accordance with game data of the game device C and game data transmitted from the game devices A, B and D. This consequently causes a difference between a result of the game processes performed by the game device A and a result of the game processes performed by the game device C.

Therefore, a feature of certain exemplary embodiments is to provide a network game system capable of disconnecting from a user terminal whose connection status to the other user terminals in the network is unstable or which is in a state of connection-disabled, thereby solving the above-described problem in the conventional peer-to-peer network game system, i.e., preventing a status of a game commonly executed by user terminals in the game system from being differently displayed on a screen of each of the user terminals.

Certain exemplary embodiments have the following aspects to achieve the feature mentioned above. Note that reference numerals and the like indicated between parentheses are merely provided to facilitate the understanding of certain exemplary embodiments in relation to the drawings, rather than limiting the scope of the certain exemplary embodiments in any way.

A first aspect of certain exemplary embodiments is a computer-readable storage medium for storing a game program (20) which is, in a game system in which a plurality of game devices (10) transmit and receive game data to and from each other and each of the plurality of game devices performs game processes by using the game data received from other game devices, executed by each of the plurality of game devices. The game program causes a computer (11) of each of the plurality of game devices to function as communication partners list addition means (S12), communication status determination means (S30), first communication status information update means (S32), communication status information transmission means (S38), communication status information reception means (S16), second communication status information update means (S36) and communication partners list deletion means (S42). The communication partners list addition means is for, when another game device is newly connected to a network, to which said each of the plurality of game devices belongs, as a new communication partner, adding the new communication partner to a communication partners list (21) which is a listing of communication partners of said each of the plurality of game devices, the communication partners list being retained in a storage section (12) of said each of the plurality of game devices. The communication status determination means is for determining, based on a reception status (23) a signal from each of the communication partners, whether or not a communication between said each of the plurality of game devices and each of the communication partners is possible. The first communication status information update means is for, based on a determination result provided by the communication status determination means, updating as necessary a piece of communication status information about said each of the plurality of game devices (22a) which is retained in the storage section and which shows whether or not the communication between said each of the plurality of game devices and each of the communication partners is possible. The communication status information transmission means is for regularly transmitting the piece of communication status information about said each of the plurality of game devices (22a) to the communication partners. The communication status information reception means is for receiving, from the communication partners, pieces of communication status information about the communication partners (22b), and storing the pieces of communication status information in the storage section. The second communication status information update means is for referring to the pieces of communication status information about the communication partners received by the communication status information reception means, and, when any of the pieces of communication status information about the communication partners indicates that a particular game device which is one of the communication partners is unable to perform communication, updating the piece of communication status information about said each of the plurality of communication devices (22a) such that the piece of communication status information indicates that the particular game device is unable to perform communication. The communication partners list deletion means is for referring to the piece of communication status information about said each of the plurality of game devices (22a) and the pieces of communication status information about the communication partners (22b) which are retained in the storage section, and, when all pieces of communication status information indicate that a particular game device which is one of the communication partners is unable to perform communication, deleting the particular game device from the communication partners list (21).

As a modification example of the first aspect, the game program may further cause the computer of each of the plurality of game devices to function as: game data transmission/reception means (S38, S16) for transmitting and receiving the game data to and from each of the communication partners specified by the communication partners list; and game processing means (S23) for performing game processes in accordance with the game data received from each of the communication partners by the game data transmission/reception means.

As another modification example of the first aspect, the game data transmission/reception means may regularly transmit and receive the game data.

As still another modification example of the first aspect, the piece of communication status information about each of the plurality of game devices is transmitted to any of the communication partners by the communication status information transmission means of said each of the plurality of game devices at a same time when the game data is transmitted to said any of the communication partners by the game data transmission/reception means of said each of the plurality of game devices.

As still another modification example of the first aspect, the piece of communication status information about each of the plurality of game devices may contain a list showing, from among the communication partners of said each of the plurality of game devices which are listed in the communication partners list, only communication partners which have been determined by the communication status determination means as being able to perform communication (FIG. 7A).

As still another modification example of the first aspect, the communication status determination means may measure an elapsed time from a last reception of a signal from each of the communication partners, and may determine, based on whether or not the elapsed time has reached a predetermined period of time, whether or not a communication with said each of the communication partners is possible.

A second aspect of certain exemplary embodiments is a game device used in a game system in which a plurality of game devices (10) transmit and receive game data to and from each other, and each of the plurality of game devices performs game processes by using the game data received from other game devices. The game device comprises communication partners list addition means (11, S12), communication status determination means (11, S30), first communication status information update means (11, S32), communication status information transmission means (11, S38), communication status information reception means (11, S16), second communication status information update means (11, S36) and communication partners list deletion means (11, S42).

A third aspect of certain exemplary embodiments is a game processing method which a plurality of game devices, which transmit and receive game data to and from each other, each execute by using the game data received from other game devices. The game processing method comprises: a communication partners list addition step of, when another game device is newly connected to a network, to which each of the plurality of game devices belongs, as a new communication partner, adding the new communication partner to the communication partners list which is a listing of communication partners of said each of the plurality of game devices, the communication partners list being retained in a storage section of said each of the plurality of game devices; a communication status determination step of determining, based on a status of receiving a signal from each of the communication partners, whether or not a communication between said each of the plurality of game devices and each of the communication partners is possible; a first communication status information update step of, based on a determination result provided at the communication status determination step, updating as necessary a piece of communication status information about said each of the plurality of game devices which is retained in the storage section and which shows whether or not the communication between said each of the plurality of game devices and each of the communication partners is possible; a communication status information transmission step of regularly transmitting the piece of communication status information about said each of the plurality of game devices to the communication partners; a communication status information reception step of receiving, from the communication partners, pieces of communication status information about the communication partners, and storing the pieces of communication status information in the storage section; a second communication status information update step of referring to the pieces of communication status information about the communication partners received at the communication status information reception step, and, when any of the pieces of communication status information about the communication partners indicates that a particular game device which is one of the communication partners is unable to perform communication, updating the piece of communication status information about said each of the plurality of communication devices such that the piece of communication status information indicates that the particular game device is unable to perform communication; and a communication partners list deletion step of referring to the piece of communication status information about said each of the plurality of game devices and the pieces of communication status information about the communication partners which are retained in the storage section, and, when all pieces of communication status information indicate that a particular game device which is one of the communication partners is unable to be perform communication, deleting the particular game device from the communication partners list.

According to certain exemplary embodiments, each of the plurality of game devices in the game system ceases communicating with a game device which is currently unable to communicate with said each of the plurality of game devices only when said each of the plurality of game devices has confirmed, based on the communication status information received from the communication partners, that all of the communication partners specified by the communication partners list of said each of the plurality of game devices are prepared to cease communicating with the game device. This prevents, in a peer-to-peer network game system, e.g., the occurrence of a situation in which one game device performs game processes in accordance with game data received from three game devices, and another game device performs game processes in accordance with game data received from four game devices. Thus, differences are prevented from occurring among results of the game processes performed by the user terminals.

These and other features, aspects and advantages of certain exemplary embodiments will become more apparent from the following detailed description of the exemplary embodiments when taken in conjunction with the accompanying drawings.

BRIEF DESCRIPTION OF THE DRAWINGS

FIG. 6 is a specific example of a frame counter 23;

FIG. 7A is a first variation of a data structure of the communication status information 22;

FIG. 7B is a second variation of the data structure of the communication status information 22;

FIG. 7C is a third variation of the data structure of the communication status information 22;

FIG. 11B shows information retained in a RAM of each user terminal at the $204^{th}$ frame;

FIG. 12B shows information retained in the RAM of each user terminal at the $500^{th}$ frame;

FIG. 13B shows information retained in the RAM of each user terminal at the $502^{th}$ frame;

FIG. 14B shows information retained in the RAM of each user terminal at the $510^{th}$ frame;

FIG. 15B shows information retained in the RAM of each user terminal at the $512^{th}$ frame;

FIG. 16B shows information retained in the RAM of each user terminal at the $514^{th}$ frame;

FIG. 17B shows information retained in the RAM of each user terminal at the $516^{th}$ frame;

FIG. 18B shows information retained in the RAM of each user terminal at the $520^{th}$ frame;

FIG. 19B is another diagram showing information retained in the RAM of each user terminal at the $520^{th}$ frame;

FIG. 20B shows information retained in the RAM of each user terminal at the $522^{th}$ frame;

FIG. 21B is another diagram showing information retained in the RAM of each user terminal at the $522^{th}$ frame;

FIG. 22B shows information retained in the RAM of each user terminal at the $524^{th}$ frame;

FIG. 23B shows information retained in the RAM of each user terminal at the $526^{th}$ frame;

FIG. 24B is another diagram showing information retained in the RAM of each user terminal at the $526^{th}$ frame;

FIG. 25B shows information retained in the RAM of each user terminal at the $528^{th}$ frame;

FIG. 26B is another diagram showing information retained in the RAM of each user terminal at the $528^{th}$ frame.

DETAILED DESCRIPTION

Hereinafter, certain exemplary embodiments will be described with reference to the drawings.

Figure 1:
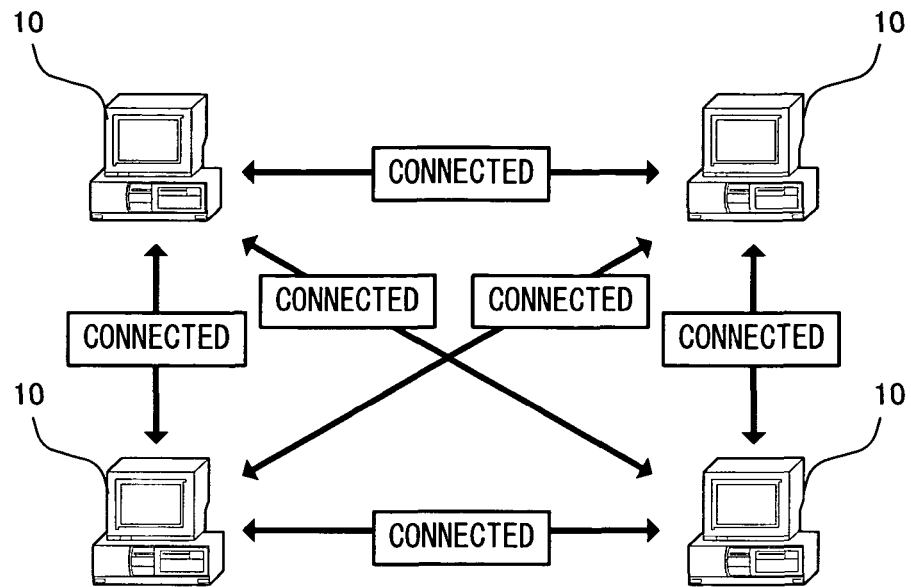
FIG. 1 shows a configuration of a network game system according to a certain exemplary embodiment.

FIG. 1 shows a configuration of a game system according to a certain exemplary embodiment. The game system comprises a plurality of user terminals (game devices) 10. The plurality of user terminals transmit and receive game data to and from each other, and each user terminal performs game processes by using the game data received from the other user terminals.

Figure 2:
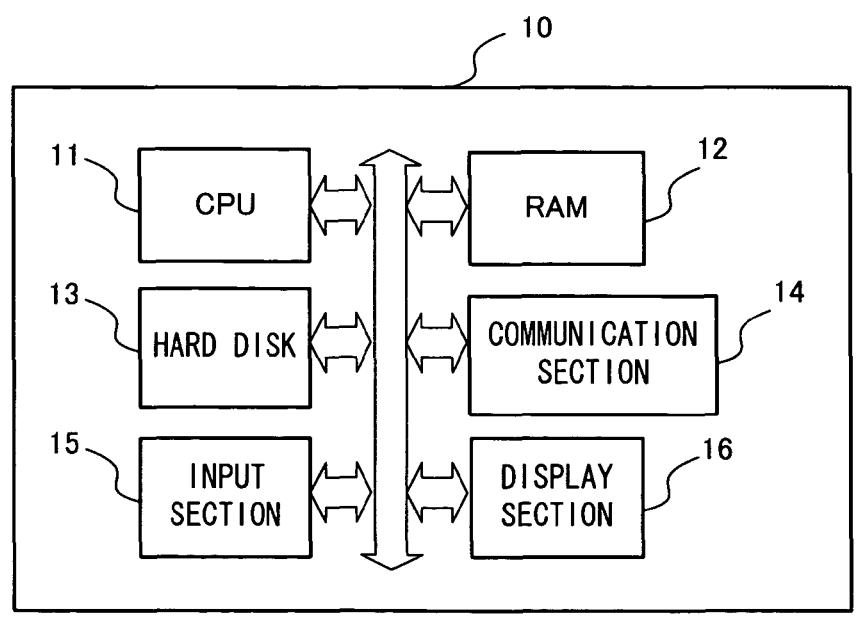
FIG. 2 is an exemplary configuration of a user terminal 10.

FIG. 2 shows an exemplary configuration of a typical user terminal 10. The user terminal 10 includes a CPU 11, RAM 12, hard disk 13, communication section 14, input section 15 and a display section 16. The CPU 11 loads, into the RAM 12, a game program prestored in the hard disk 13, and executes the program. Although an example in which the game program is prestored in the hard disk 13 is described here, the certain exemplary embodiments are not limited thereto. The game program may be supplied to the user terminal 10 through an external storage medium such as a memory card, a cartridge or a DVD-ROM. Also, the game program may be supplied to the user terminal 10 through the communication section 14. The CPU 11 executes a video game such as a racing game by executing the game program. The input section 15 is used for game operations. The display section 16 is used to display game images.

Figure 3:
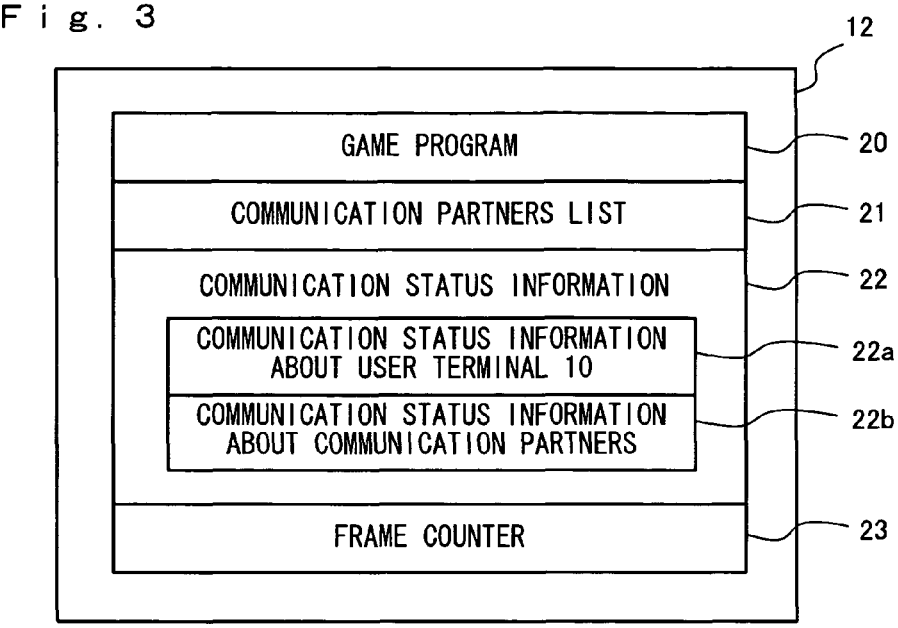
FIG. 3 is an exemplary memory map of a RAM 12.

FIG. 3 is an exemplary memory map of the RAM 12 of the user terminal 10. The RAM 12 stores, in addition to a game program 20 having been loaded from the hard disk 13, a communication partners list 21, communication status information 22 and a frame counter 23. The communication partners list 21, communication status information 22 and frame counter 23 are updated as necessary in accordance with a progress of the game.

Figure 4:
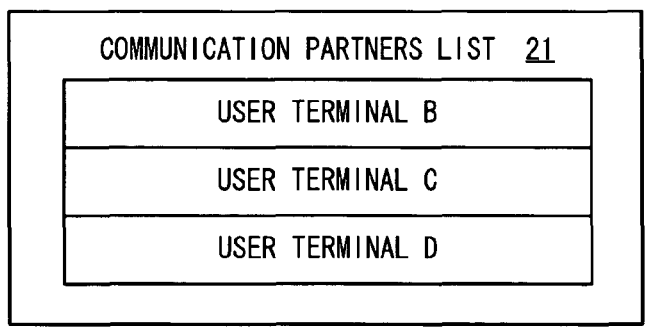
FIG. 4 is a specific example of a communication partners list 21.

The communication partners list 21 is a list showing user terminals to and from which the user terminal 10 transmits and receive game data (hereinafter, such user terminals are referred to as communication partners). For example, when the game system comprises four user terminals A, B, C and D, and communications among these four user terminals are normally performed, the communication partners list retained in the RAM of the user terminal A is as shown in FIG. 4.

Figure 5:
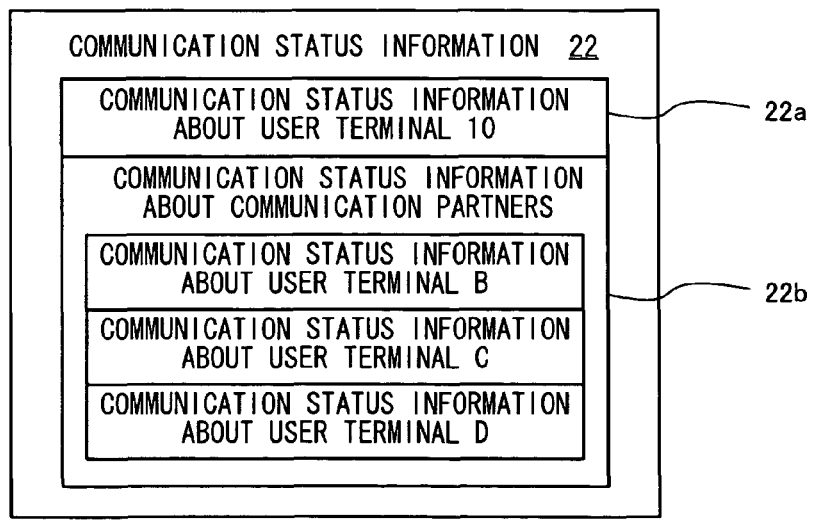
FIG. 5 is a specific example of communication status information 22.

The communication status information 22 indicates whether communications between the user terminal 10 and communication partners thereof listed in the communication partners list 21 are possible. Note that, the user terminals in the game system transmit to and receive from each other the communication status information 22. Each user terminal retains, in the RAM 12, the communication status information 22 comprising communication status information 22a about said each user terminal and communication status information 22b received from communication partners (i.e., communication status information 22b about the communication partners). FIG. 5 shows exemplary communication status information 22 retained in the RAM of the user terminal A.

The frame counter 23 measures an elapsed time (counts the number of elapsed frames) from the last reception of a signal from each of the communication partners listed in the communication partners list 21. FIG. 6 shows an exemplary frame counter 23 retained in the RAM of the user terminal A. As described later, when the frame counter 23 of the user terminal A has counted, for any communication partner, the number of elapsed frames to a predetermined threshold value (e.g., 300), the user terminal A determines said any communication partner has become unable to communicate with the user terminal A. Note that, the threshold value may be changed as necessary in accordance with a progress of the game. For example, a threshold value, which is used when the game system is calling for entries to a racing game, may be different from a threshold value which is used when the racing game is being played.

As described above, the communication status information 22 indicates whether communications between the user terminal 10 and the communication partners thereof listed in the communication partners list 21 are possible. Various data structures of the information 22 may be conceived. FIGS. 7A, 7B and 7C respectively show three exemplary pieces of communication status information retained in the RAM of the user terminal A (three exemplary pieces of the communication status information 22a about the user terminal A) in the case where the communication between the user terminals A and B has failed in the game system comprising the four user terminals A, B, C and D. FIG. 7A is an example in which the communication status information 22a indicates, from among all communication partners listed in the communication partners list 21, only communication partners with which the user terminal A can communicate. FIG. 7B is an example in which the communication status information 22a indicates, for each communication partner listed in the communication partners list 21, whether or not the user terminal A can communicate with said each communication partner. FIG. 7C is an example in which the communication status information 22a indicates, from among all communication partners listed in the communication partners list 21, only communication partners with which the user terminal A cannot communicate. It is assumed in the description below that the communication status information 22a has a data structure shown in FIG. 7A.

Hereinafter, a sequence of processes, which the CPU 11 of the user terminal 10 performs in accordance with the game program 20, will be described with reference to FIGS. 8 to 10.

Figure 8:
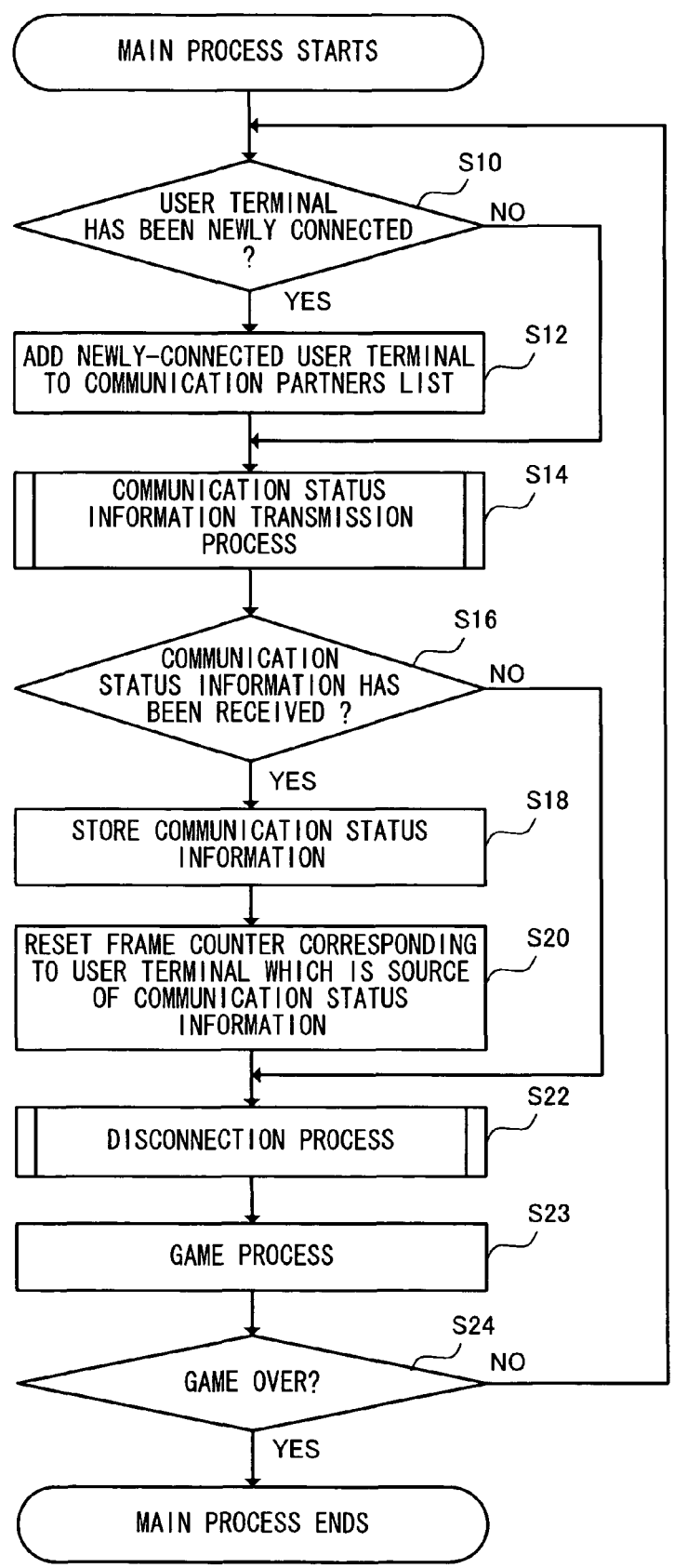
FIG. 8 is a flowchart showing a sequence of processes performed by a CPU 11.

FIG. 8 is a flowchart showing a sequence of a main process. When the main process starts, the CPU first determines at step S10 whether a connection between the user terminal 10 and another user terminal has been newly established. If the connection has been newly established, the process proceeds to step S12. If the connection has not been newly established, the process proceeds to step S14.

At step S12, the CPU 11 adds, to the communication partners list 21 retained in the RAM 12, the newly connected user terminal (to be specific, identification information indicating the newly connected user terminal).

At step S14, a communication status information transmission process is performed. Hereinafter, the communication status information transmission process will be described in detail with reference to FIG. 9.

Figure 9:
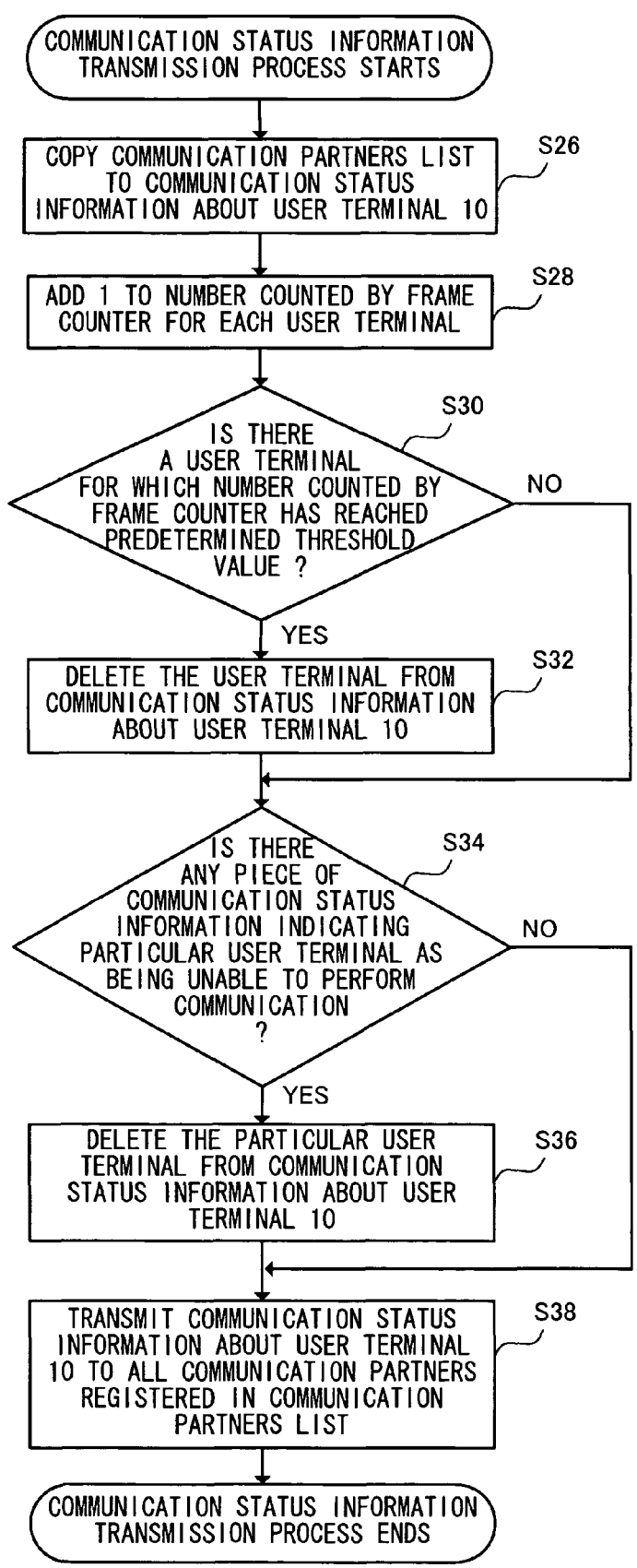
FIG. 9 is a flowchart showing a sequence of a communication status information transmission process.

At step S26 of FIG. 9, the CPU 11 copies a content of the communication partners list 21 of the user terminal 10, and overwrites, with said content, the communication status information 22a of the user terminal 10.

At step S28, the CPU 11 of the user terminal 10 adds 1 to a number counted by the frame counter 23 for each of the other user terminals.

It is determined at step S30 whether there exists any user terminal for which the number counted by the frame counter 23 has reached the predetermined threshold value (e.g., 300). When there exists such a user terminal, the process proceeds to step S32. When there does not exist such a user terminal, the process proceeds to step S34.

At step S32, the CPU 11 deletes, from the communication status information 22a about the user terminal 10, a user terminal for which the number counted by the frame counter 23 has reached the predetermined threshold value.

The CPU 11 of the user terminal 10 determines at step S34 whether any of pieces of communication status information received from the other user terminals, i.e., any of pieces of communication status information 22b stored in the RAM 12 which are about the communication partners, indicates a user terminal with which the user terminal 10 cannot currently communicate. When such a user terminal is indicated, the process proceeds to step S36. When such a user terminal is not indicated, the process proceeds to step S38. For example, if, in the case where the game system comprises four user terminals A, B, C and D, the user terminal B receives from the user terminal A the communication status information shown in FIG. 7A, a determination result at step S34 provided by the user terminal B is positive since the communication status information indicates that the user terminals A and C cannot communicate with each other.

At step S36, the CPU 11 deletes, from the communication status information 22a about the user terminal 10, a user terminal which is indicated, by any of pieces of communication status information 22b stored in the RAM 12 which are about the communication partners, as being unable to perform communication. In the above example, the CPU 11 of the user terminal B deletes the user terminal C from the communication status information 22a about the user terminal B.

At step S38, the CPU 11 of the user terminal 10 transmits, to all communication partners listed in the communication partners list 21, the communication status information 22a about the user terminal 10 together with game data (note that, the communication status information 22a is not necessarily transmitted with the game data). In other words, transmitted here as the communication status information 22a is a list of user terminals which results from deleting, from the communication partners list 21 of the user terminal 10, a user terminal which the user terminal 10 is in the process of ceasing communicating with and a user terminal which another user terminal is in the process of ceasing communicating with. When a transmission of the communication status information 22a is completed at step S38, the communication status information transmission process ends, and the main process proceeds to step S16 of FIG. 8.

It is determined at step S16 whether the communication status information has been received from any of the communication partners. When the communication status information has been received, the process proceeds to step S18. When the communication status information has not been received, the process proceeds to step S22.

At step S18, the CPU 11 overwrites, by using the communication status information received from said any of the communication partners, the communication status information 22b stored in the RAM 12 which is about said any of the communication partners.

At step S20, the CPU 11 resets a number to 0, the number having been counted by the frame counter 23 for said any of the communication partners which is a source of the received communication status information.

At step S22, a disconnection process is performed. Hereinafter, the disconnection process is described in detail with reference to FIG. 10.

Figure 10:
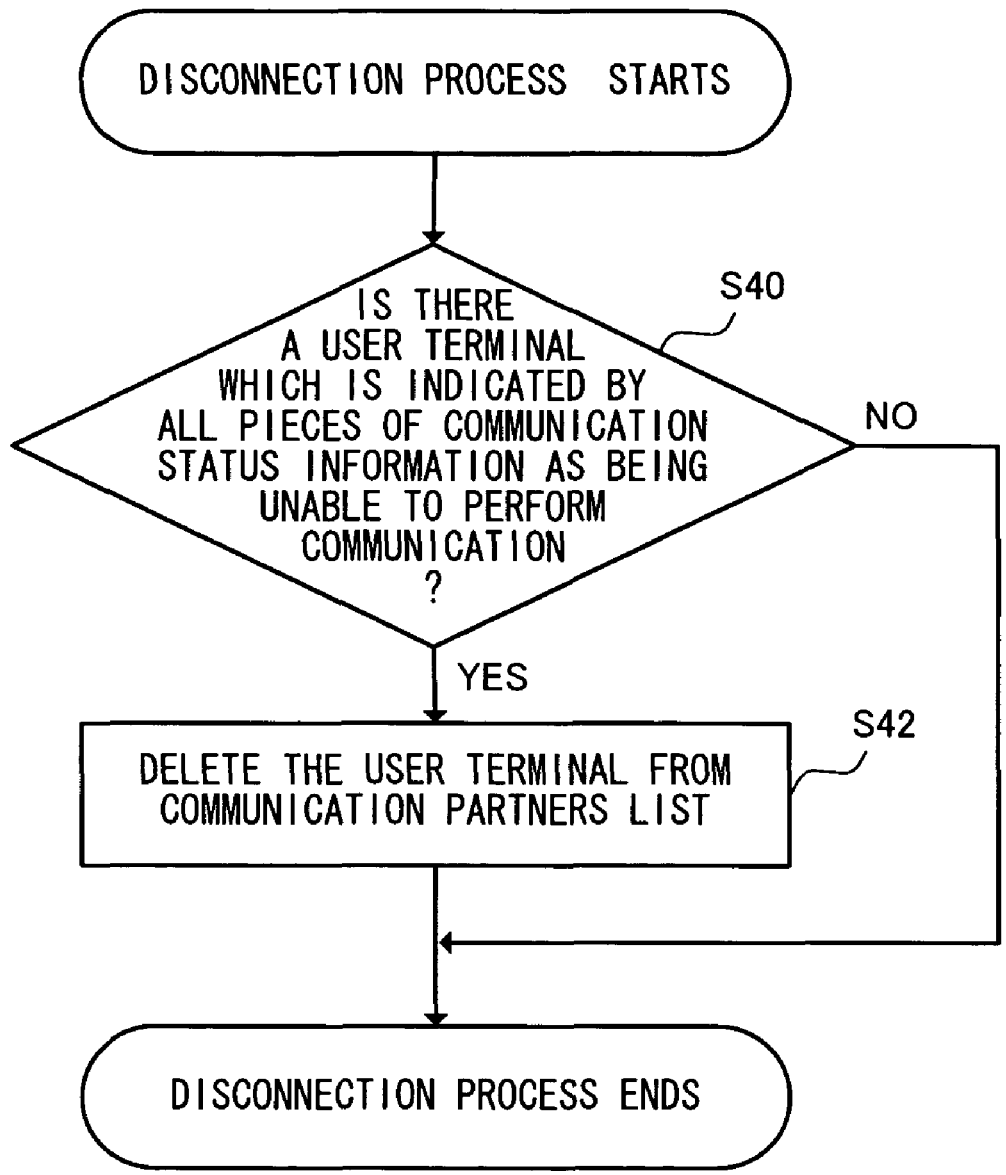
FIG. 10 is a flowchart showing a sequence of a disconnection process.

At step S40 of the disconnection process in FIG. 10, the CPU 11 refers, in the RAM 12, to a piece of communication status information about the user terminal 10 and pieces of communication status information received from the communication partners listed in the communication partners list 21, and determines whether there is a user terminal which is indicated, in all pieces of communication status information, as being unable to perform communication. When there is such a user terminal, the disconnection process proceeds to step S42. When there is not such a user terminal, the disconnection process ends, and then the main process proceeds to step S23 of FIG. 8.

At step S42, the user terminal which is shown, in said all pieces of communication status information stored in the RAM 12, as being unable to perform communication is deleted from the communication partners list 21. As a result, game data and the communication status information cease being transmitted to the user terminal deleted from the communication partners list 21. When step S42 is completed, the disconnection process ends, and then the main process proceeds to step S23 of FIG. 8.

At step S23, the CPU 11 performs game processes in accordance with inputs from the input section 15 and game data received from each communication partner.

It is determined at step S24 whether the game has ended. When the game has ended, the main process ends. When the game has not ended, the main process returns to step S10, and steps S10 to S23 are repeatedly performed with a period of 1 frame (1/60 second) until the game ends.

Thus, in the case where the user terminal 10 ceases communicating with a particular user terminal, the user terminal 10 performs the above-described steps, thereby confirming, based on the communication status information received from all of communication partners currently connected to the user terminal 10, that the all of currently-connected communication partners are prepared to cease communicating with the particular user terminal, and then ceases communicating with the particular user terminal. This prevents differences from occurring among results of the game processes performed by the user terminals.

It is described above that at step S38 of FIG. 9, the user terminal 10 transmits at each frame, to all communication partners listed in the communication partners list 21, the communication status information 22a together with the game data. However, the certain exemplary embodiments not limited thereto. Alternatively, the user terminal 10 may transmit the game data and the communication status information separately. Further alternatively, the user terminal 10 may sequentially transmit in a predetermined order, to a plurality of communication partners, the game data together with the communication status information. For example: a user terminal A first transmits the game data and communication status information to a user terminal B; when two frames have elapsed therefrom, the user terminal A transmits the game data and communication status information to a user terminal C; when two frames have elapsed therefrom, the user terminal A transmits the game data and communication status information to a user terminal D; and when two frames have elapsed therefrom, the user terminal A again transmits the game data and communication status information to the user terminal B.

Hereinafter, a sequence of processes, which are performed when, in the game system comprising four user terminals A, B, C and D, a failure occurs on a communication line between the user terminals A and B, will be described in detail with reference to FIGS. 11A to 26B. Here, it is assumed that each user terminal transmits the communication status information to one of communication partners thereof in rotation after every second frame (i.e., transmissions of the communication status information to all communication partners are performed with a 6-frame period). Also, it is assumed that a time lag in data communication is a 10-frame period.

Figure 11A:
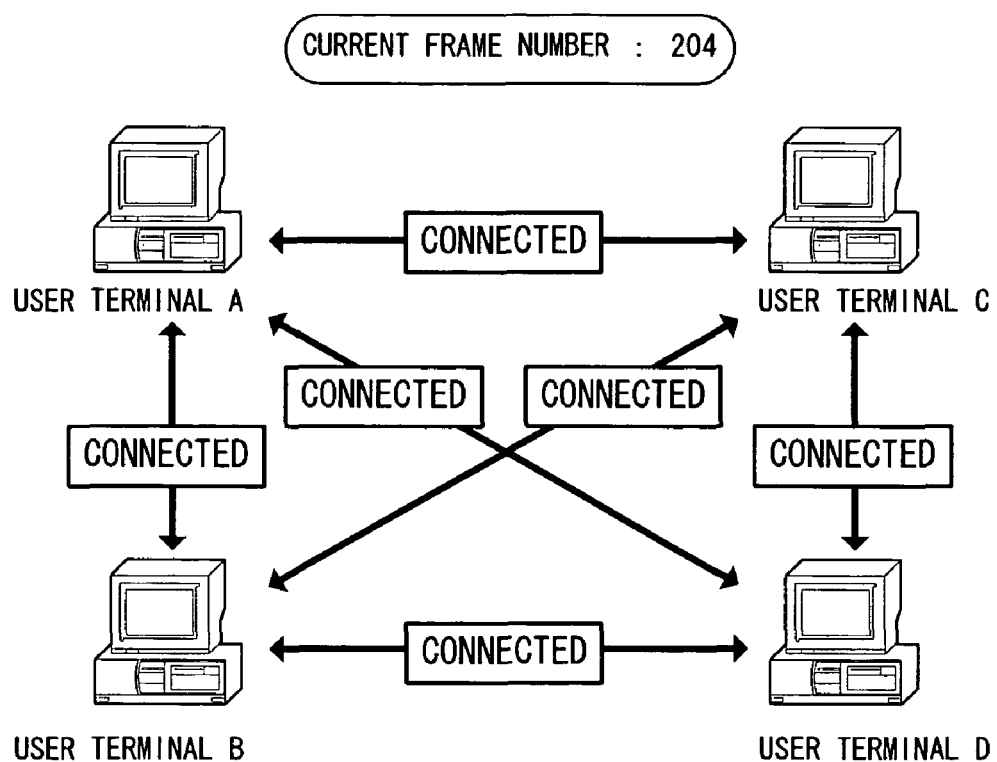
FIG. 11A shows relationships among user terminals at a $204^{th}$ frame.

FIG. 11A shows connection relationships among the user terminals at a $204^{th}$ frame. At this point, a failure has not occurred to any communication lines among the user terminals. FIG. 11B shows information retained in the RAM of each of the user terminals at the $204^{th}$ frame. For example, the communication partners list 21 retained by the user terminal A contains the user terminals B, C and D. In the frame counter 23 retained by the user terminal A, the number of frames counted for the user terminal B is 2; the number of frames counted for the user terminal C is 0; and the number of frames counted for the user terminal D is 4. The user terminal A retains, as the communication status information 22b about communication partners thereof, the communication status information about the user terminals B, C and D. For example, the communication status information about the user terminal B contains the user terminals A, C and D, and the communication status information 22a about the user terminal A, which the user terminal A retains, contains the user terminals B, C and D.

Figure 12A:
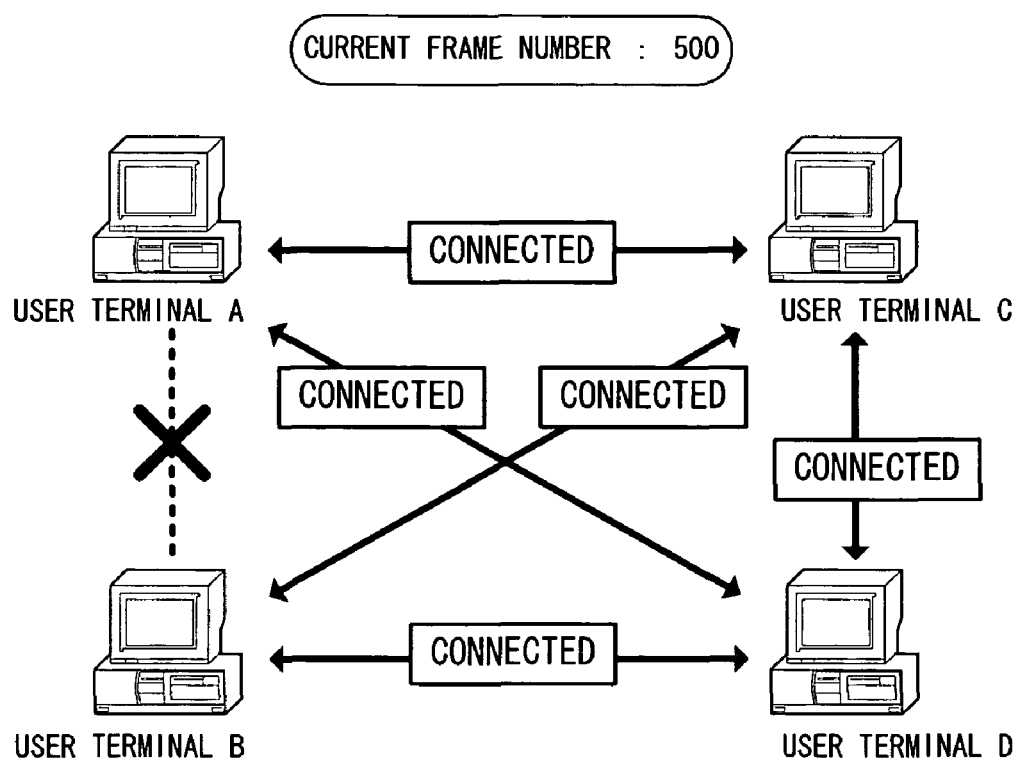
FIG. 12A shows relationships among the user terminals at a $500^{th}$ frame.

If a failure occurs, immediately after the $204^{th}$ frame, on a communication line between the user terminals A and B, connection relationships among the user terminals and information retained in the RAM of each of the user terminals are as shown in FIGS. 12A and 12B at a $500^{th}$ frame. Since the number counted for the user terminal A by the frame counter of the user terminal B reaches a predetermined threshold value (300) at the $500^{th}$ frame, the user terminal B determines (to be more specific, the CPU of the user terminal B determines) that the user terminal A is currently unable to communicate with the user terminal B, and then deletes the user terminal A from the communication status information about the user terminal B. Note that, due to a timing of transmitting the communication status information and the time lag in data communication, terminals currently connected to the user terminal B are notified of such a deletion of the user terminal A from the communication status information about the user terminal B in a few or dozens of frames after the deletion is performed.

Figure 13A:
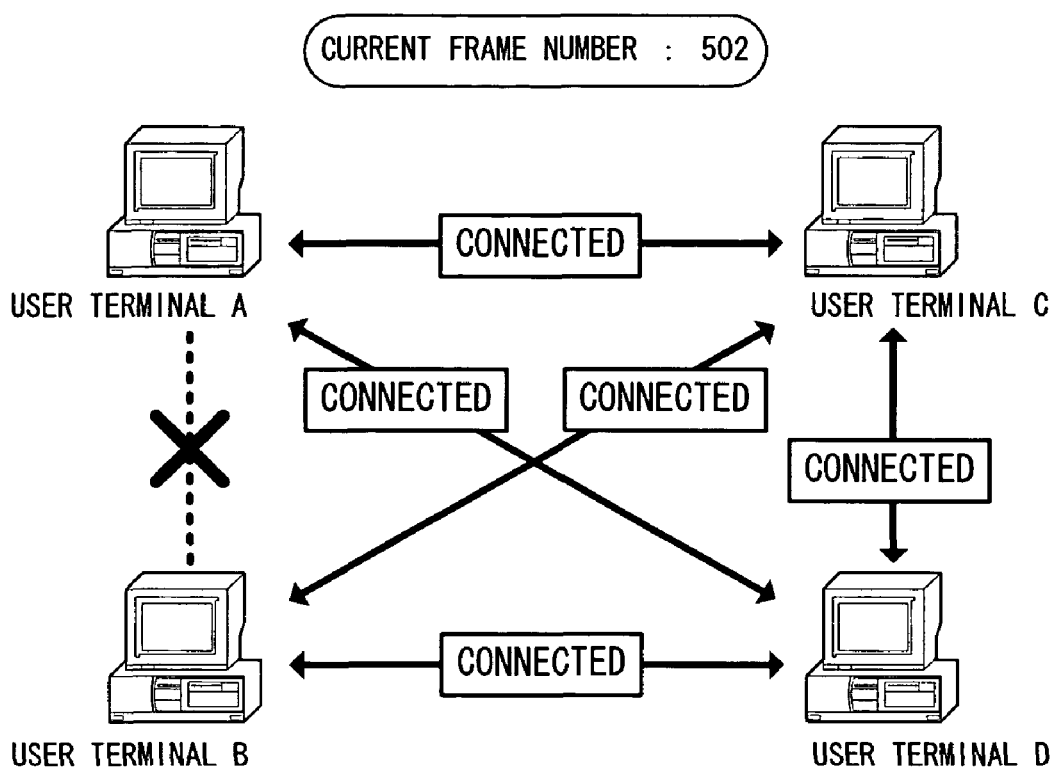
FIG. 13A shows relationships among the user terminals at a $502^{th}$ frame.

At a $502^{nd}$ frame, the connection relationships among the user terminals and the information retained in the RAM of each of the user terminals are as shown in FIGS. 13A and 13B. Since the number counted for the user terminal B by the frame counter of the user terminal A reaches the predetermined threshold value (300) at this frame, the user terminal A determines that the user terminal B is currently unable to communicate with the user terminal A, and deletes the user terminal B from the communication status information about the user terminal A.

Figure 14A:
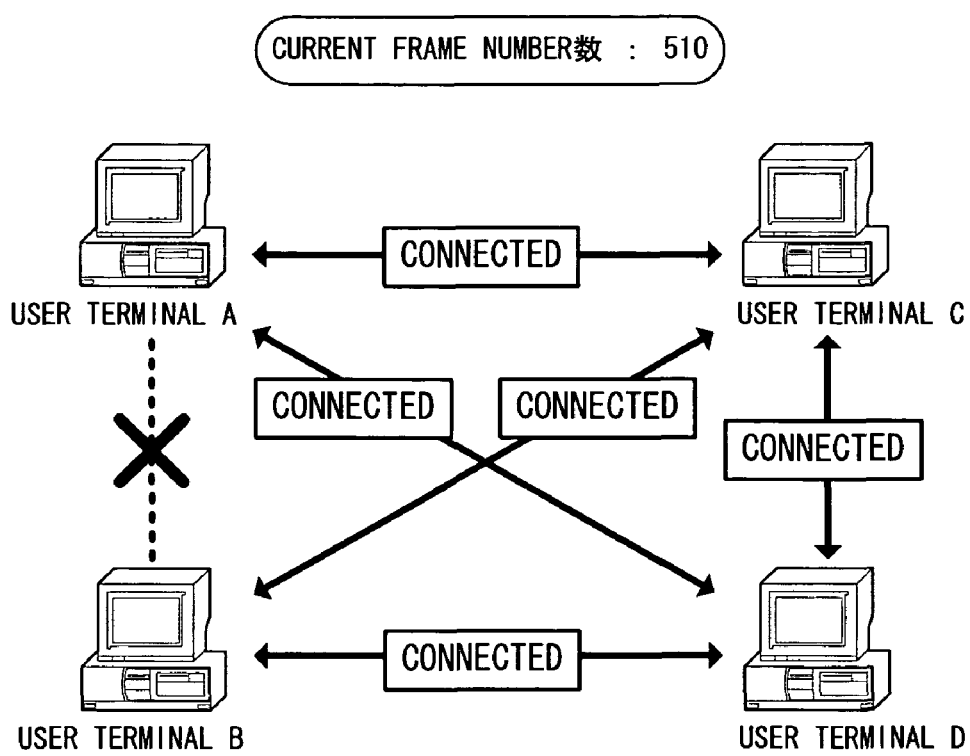
FIG. 14A shows relationships among the user terminals at a $510^{th}$ frame.

At a $510^{th}$ frame, the connection relationships among the user terminals and the information retained in the RAM of each of the user terminals are as shown in FIGS. 14A and 14B. At this frame, the communication status information transmitted from the user terminal B is received by the user terminal C. Upon receiving the information, the user terminal C recognizes that the user terminal A has been deleted from the communication status information about the user terminal B, and then the user terminal C deletes the user terminal A from the communication status information about the user terminal C.

Figure 15A:
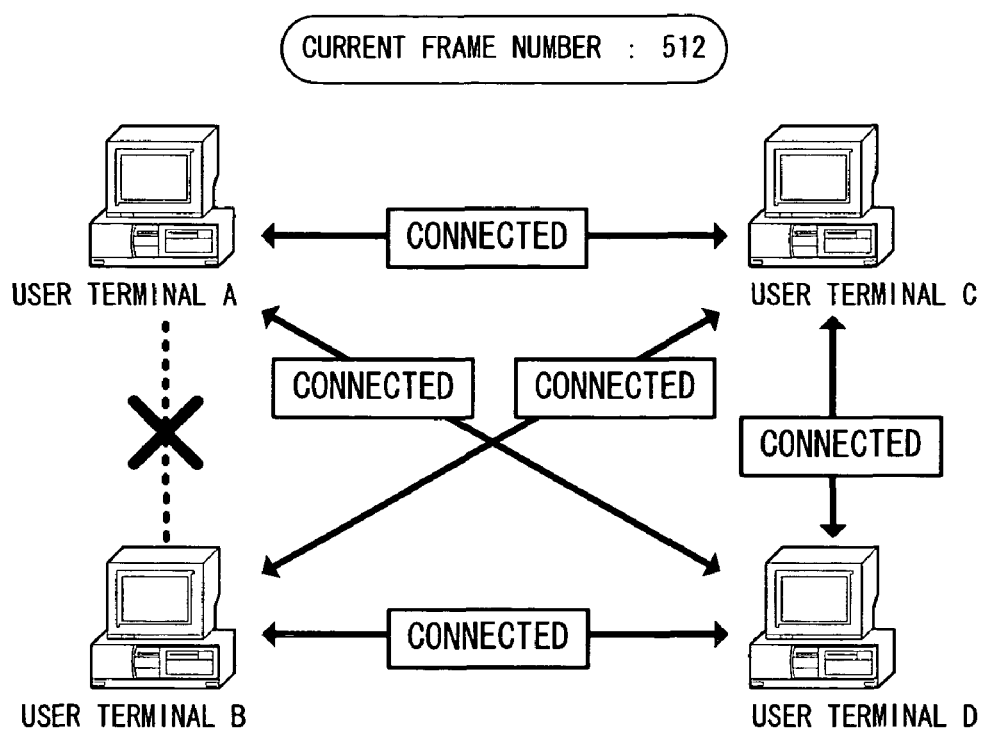
FIG. 15A shows relationships among the user terminals at a $512^{th}$ frame.

At a $512^{th}$ frame, the connection relationships among the user terminals and the information retained in the RAM of each of the user terminals are as shown in FIGS. 15A and 15B. At this frame, the communication status information transmitted from the user terminal B is received by the user terminal D. Upon receiving the information, the user terminal D recognizes that the user terminal A has been deleted from the communication status information about the user terminal B, and then the user terminal D deletes the user terminal A from the communication status information about the user terminal D.

Figure 16A:
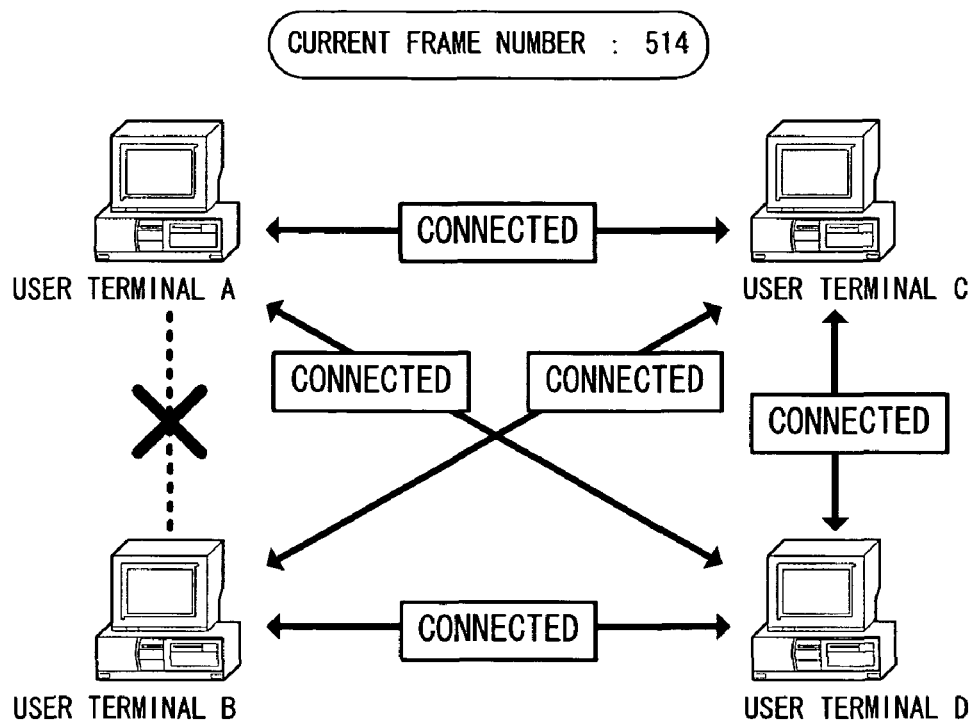
FIG. 16A shows relationships among the user terminals at a $514^{th}$ frame.

At a $514^{th}$ frame, the connection relationships among the user terminals and the information retained in the RAM of each of the user terminals are as shown in FIGS. 16A and 16B. At this frame, the communication status information transmitted from the user terminal A is received by the user terminal C. Upon receiving the information, the user terminal C recognizes that the user terminal B has been deleted from the communication status information about the user terminal A, and the user terminal C deletes the user terminal B from the communication status information about the user terminal C.

Figure 17A:
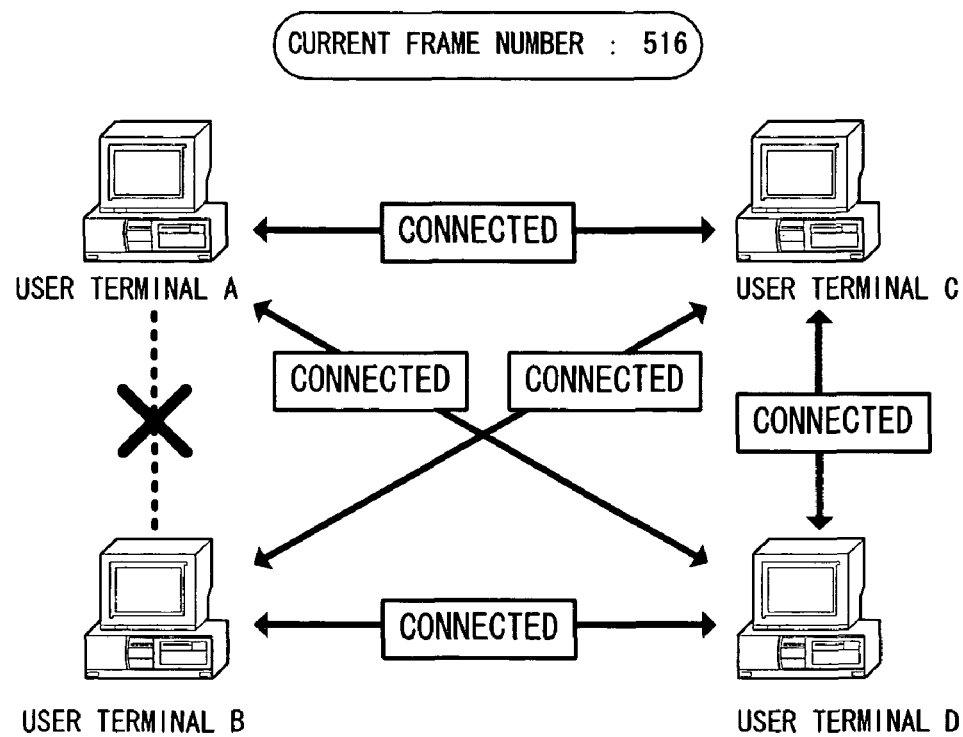
FIG. 17A shows relationships among the user terminals at a $516^{th}$ frame.

At a $516^{th}$ frame, the connection relationships among the user terminals and the information retained in the RAM of each of the user terminals are as shown in FIGS. 17A and 17B. At this frame, the communication status information transmitted from the user terminal A is received by the user terminal D. Upon receiving the information, the user terminal D recognizes that the user terminal B has been deleted from the communication status information about the user terminal A, and the user terminal D deletes the user terminal B from the communication status information about the user terminal D.

Figure 18A:
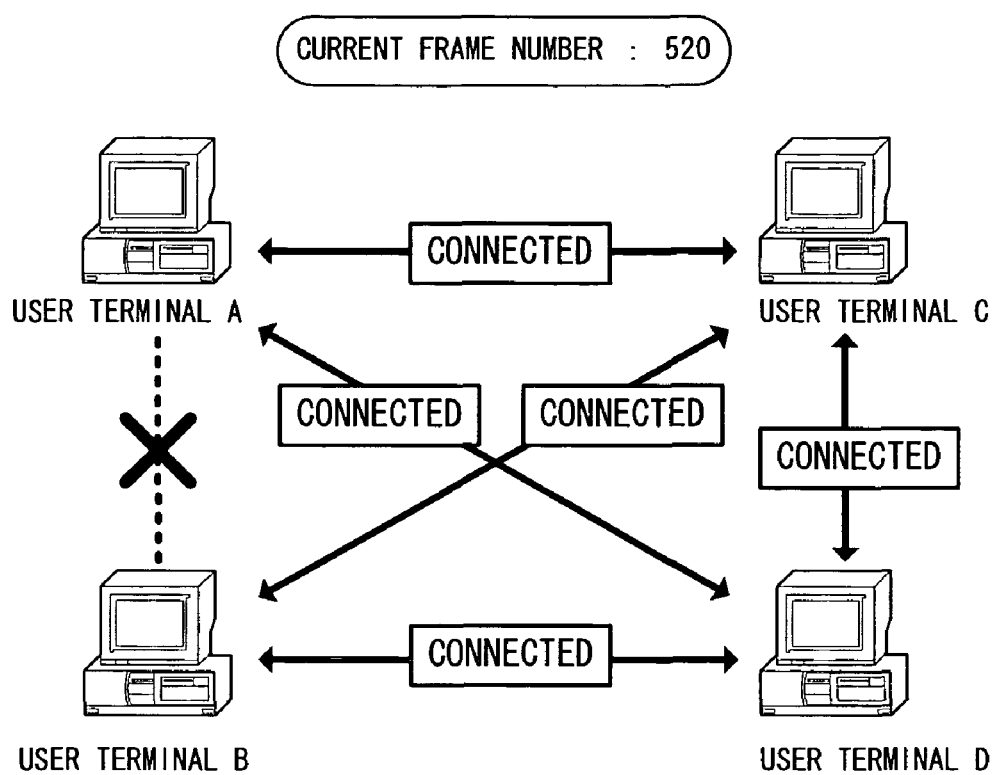
FIG. 18A shows relationships among the user terminals at a $520^{th}$ frame.
Figure 19A:
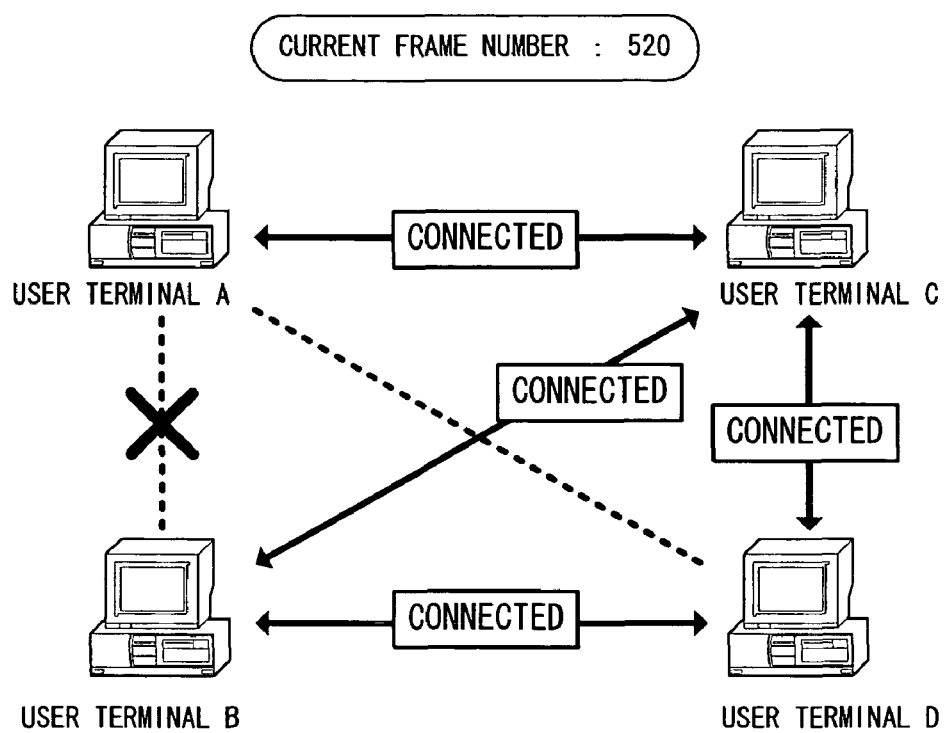
FIG. 19A is another diagram showing relationships among the user terminals at the $520^{th}$ frame.

At a $520^{th}$ frame, the connection relationships among the user terminals and the information retained in the RAM of each of the user terminals are as shown in FIGS. 18A and 18B. At this frame, the communication status information transmitted from the user terminal C is received by the user terminal D. Upon receiving the information, the user terminal D recognizes that the user terminal A has been deleted from the communication status information about the user terminal C, and that the user terminal A is not contained in the communication status information about the other communication partners of the user terminal D. Then, as shown in FIG. 19B, the user terminal D deletes from the communication partners list thereof the user terminal A. As a result, as shown in FIG. 19A, a connection between the user terminals A and D is disconnected.

Figure 20A:
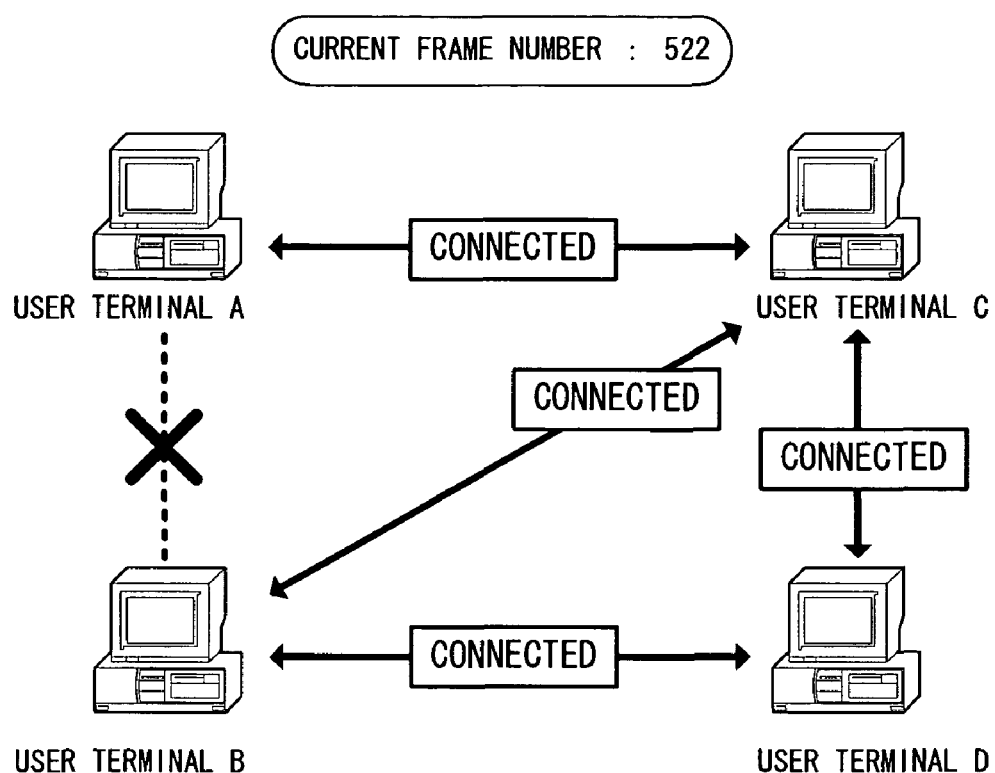
FIG. 20A shows relationships among the user terminals at a $522^{th}$ frame.
Figure 21A:
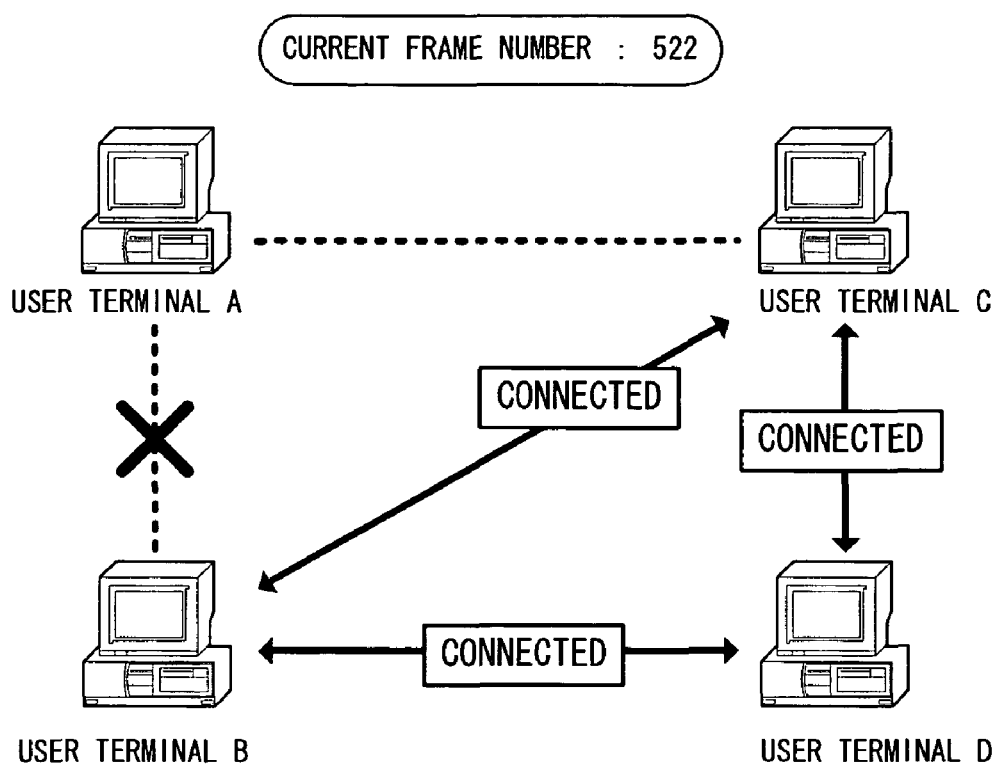
FIG. 21A is another diagram showing relationships among the user terminals at the $522^{th}$ frame.

At a $522^{nd}$ frame, the connection relationships among the user terminals and the information retained in the RAM of each of the user terminals are as shown in FIGS. 20A and 20B. At this frame, the communication status information transmitted from the user terminal C is received by the user terminal A, and the communication status information transmitted from the user terminal D is received by the user terminal C. Upon receiving the information, the user terminal C recognizes that the user terminal A has been deleted from the communication status information about the user terminal D, and that the user terminal A is not contained in the communication status information about the other communication partners of the user terminal C. Then, as shown in FIG. 21B, the user terminal C deletes from the communication partners list thereof the user terminal A. As a result, as shown in FIG. 21A, a connection between the user terminals A and C is disconnected.

Figure 22A:
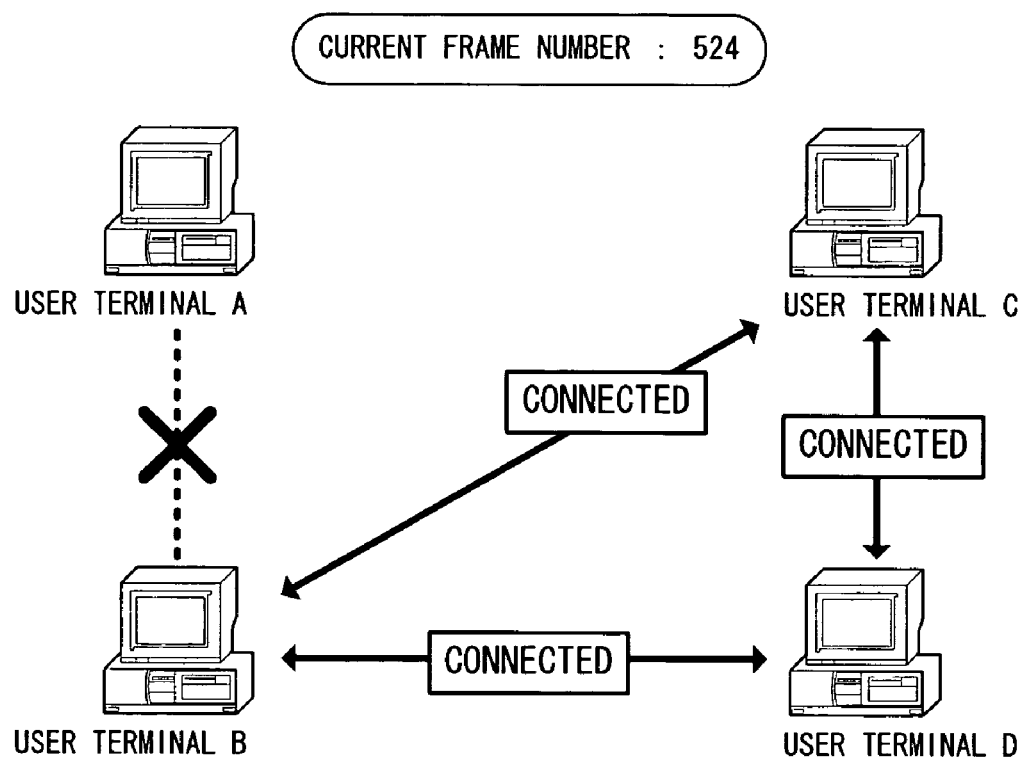
FIG. 22A shows relationships among the user terminals at a $524^{th}$ frame.

At a $524^{th}$ frame, the connection relationships among the user terminals and the information retained in the RAM of each of the user terminals are as shown in FIGS. 22A and 22B. At this frame, the communication status information transmitted from the user terminal C is received by the user terminal B.

Figure 23A:
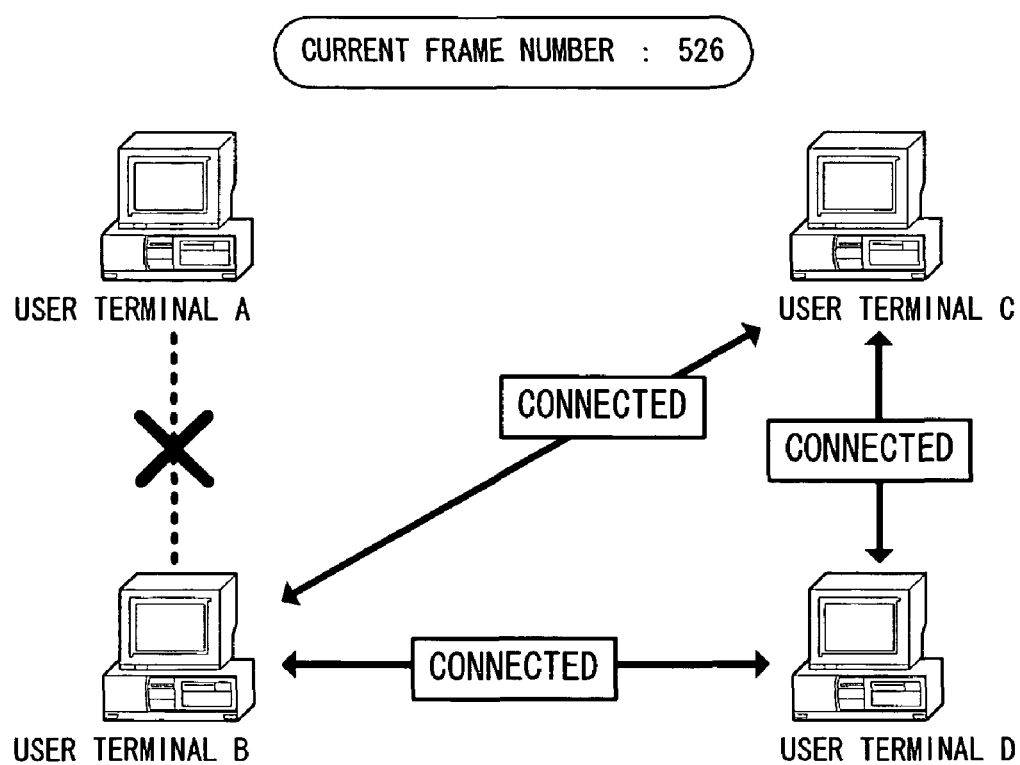
FIG. 23A shows relationships among the user terminals at a $526^{th}$ frame.
Figure 24A:
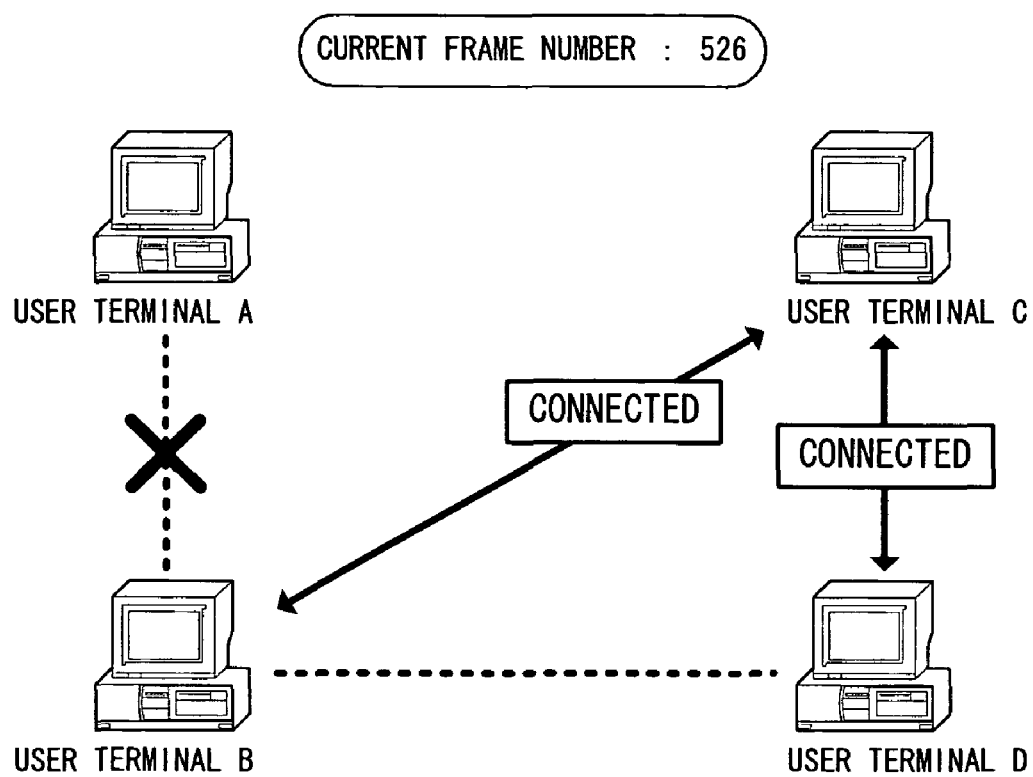
FIG. 24A is another diagram showing relationships among the user terminals at the $526^{th}$ frame.

At a $526^{th}$ frame, the connection relationships among the user terminals and the information retained in the RAM of each of the user terminals are as shown in FIGS. 23A and 23B. At this frame, the communication status information transmitted from the user terminal D is received by the user terminal B, and the communication status information transmitted from the user terminal C is received by the user terminal D. Upon receiving the information, the user terminal D recognizes that the user terminal B has been deleted from the communication status information about the user terminal C, and that the user terminal B is not contained in the communication status information about the other communication partners of the user terminal D. Then, as shown in FIG. 24B, the user terminal D deletes from the communication partners list thereof the user terminal B. As a result, as shown in FIG. 24A, a connection between the user terminals B and D is disconnected.

Figure 25A:
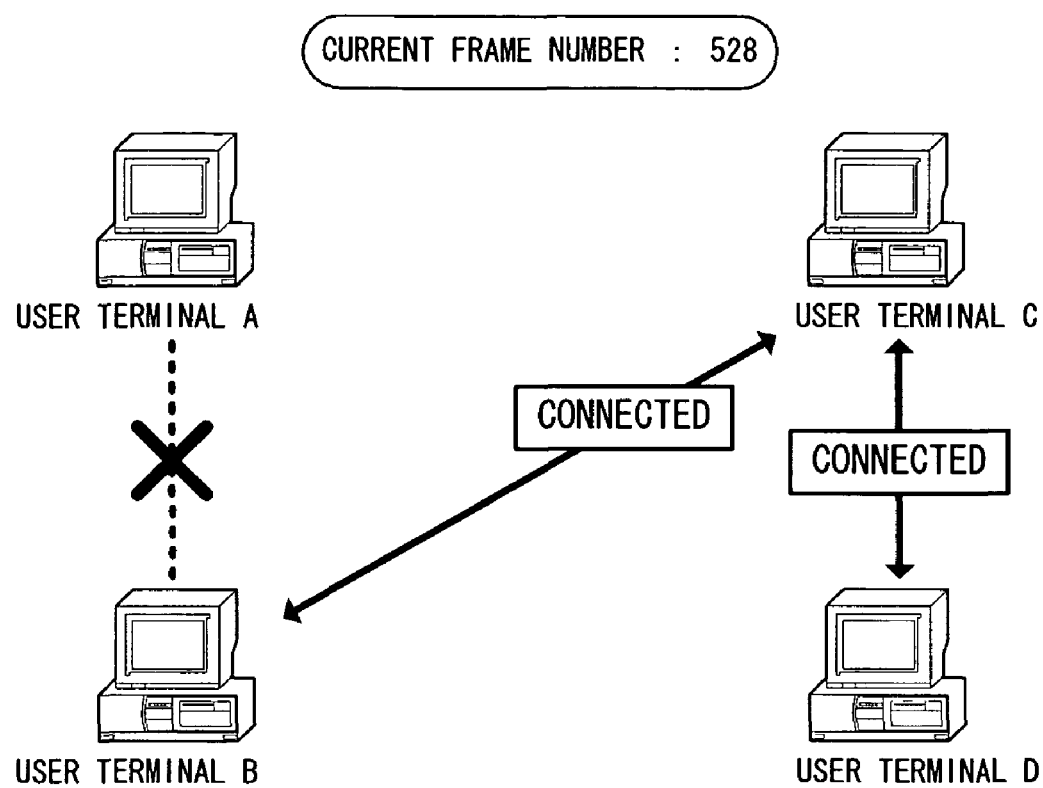
FIG. 25A shows relationships among the user terminals at a $528^{th}$ frame.
Figure 26A:
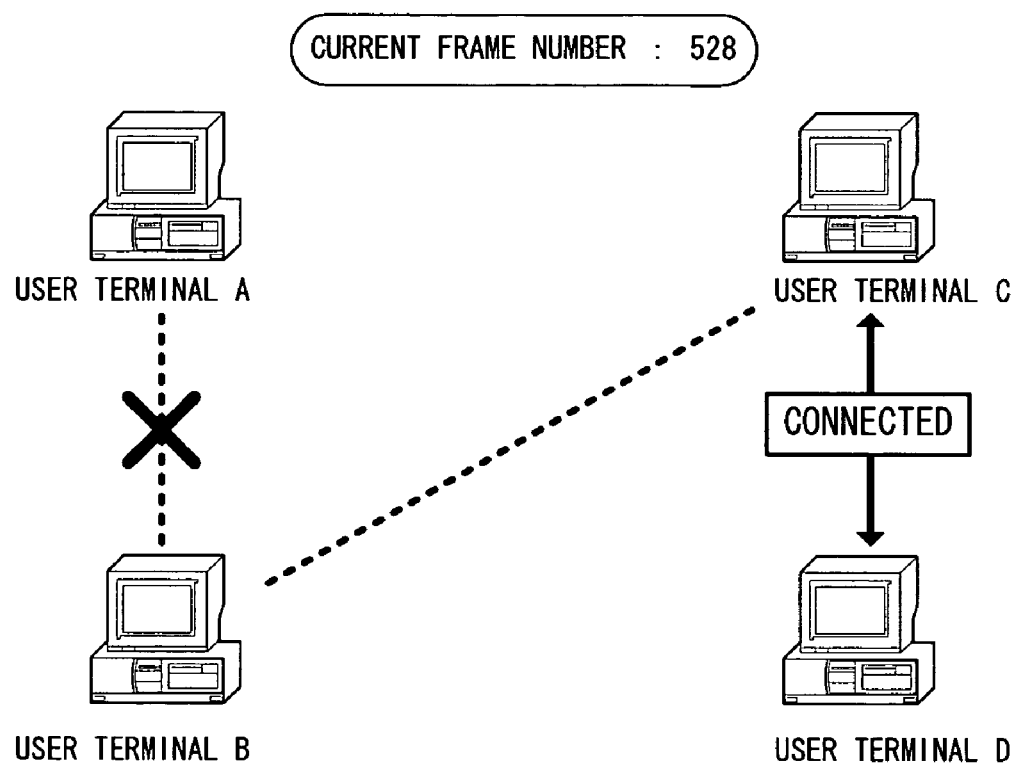
FIG. 26A is another diagram showing relationships among the user terminals at the $528^{th}$ frame.
Figure 27:
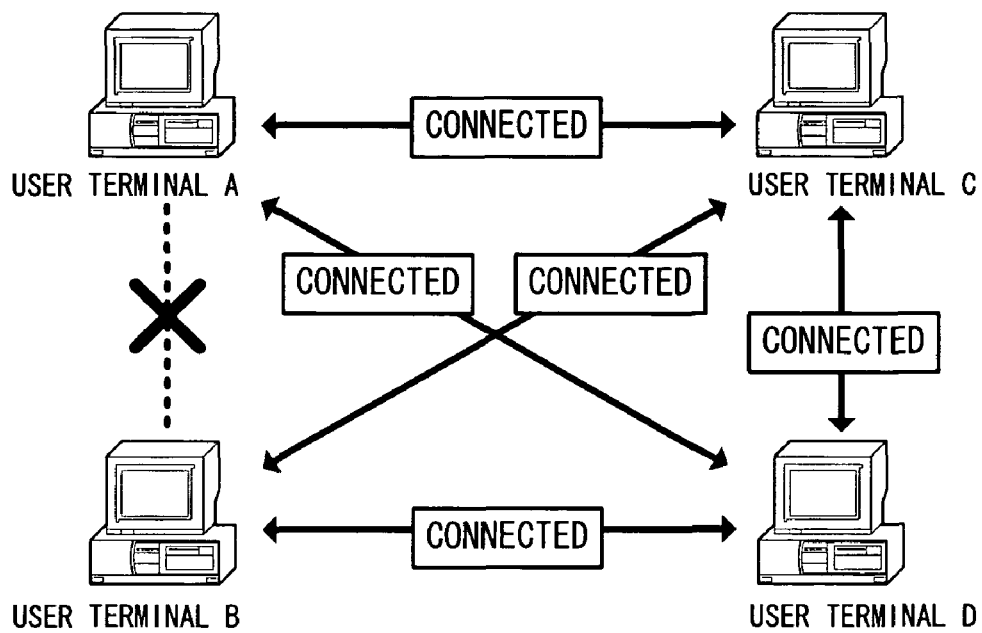
FIG. 27 shows relationships among game devices in a conventional peer-to-peer network game system in which a communication failure has occurred.

At a $528^{th}$ frame, the connection relationships among the user terminals and the information retained in the RAM of each of the user terminals are as shown in FIGS. 25A and 25B. At this frame, the communication status information transmitted from the user terminal D is received by the user terminal C. Upon receiving the information, the user terminal C recognizes that the user terminal B has been deleted from the communication status information about the user terminal D, and that the user terminal B is not contained in the communication status information about the other communication partners of the user terminal C. Then, as shown in FIG. 26B, the user terminal C deletes from the communication partners list thereof the user terminal B. As a result, as shown in FIG. 26A, a connection between the user terminals B and C is disconnected.

Thereafter, the game is played only by the user terminals C and D. Since the user terminal A no longer receives signals from the other user terminals, numbers, which are counted by the frame counter of the user terminal A respectively for the communication partners of the user terminal A, continuously increase. When the numbers respectively counted for the communication partners each have reached 300, the user terminal A ceases performing the game processes. Note that, the user terminal B operates here in a same manner as that of the user terminal A.

While the certain exemplary embodiments have been described in detail, the foregoing description is in all aspects illustrative and not restrictive. It is understood that numerous other modifications and variations can be devised without departing from the scope of the certain exemplary embodiments.

What is claimed is:

1. A computer-readable storage medium for storing a game program which is, in a game system in which a plurality of game devices transmit and receive game data to and from each other and each of the plurality of game devices performs game processes by using the game data received from other game devices, executed by each of the plurality of game devices, the game program causing a computer of each of the plurality of game devices to function as:
   communication status determination programmed logic circuitry for determining, based on a reception status of a signal from each of a plurality of communication partners, where each of the plurality of communication partners corresponds to a respective game device, whether or not a communication between said each of the plurality of game devices and each of the communication partners is possible;
   first communication status information update programmed logic circuitry for, based on a determination result provided by the communication status determination programmed logic circuitry, updating as necessary a piece of communication status information about said each of the plurality of game devices which is retained in a respective storage section of each of the plurality of game devices and which shows whether or not the communication between said each of the plurality of game devices and each of the communication partners is possible;
   a communication status information transmitter for regularly transmitting the piece of communication status information about said each of the plurality of game devices to the communication partners;
   a communication status information receiver for receiving, from the communication partners, pieces of communication status information about the communication partners, and storing the pieces of communication status information in the respective storage section of each of the plurality of game devices;
   second communication status information update programmed logic circuitry for referring to the pieces of communication status information about the communication partners received by the communication status information receiver, and, when any of the pieces of communication status information about the communication partners indicates that a particular game device which is one of the communication partners is unable to perform communication, updating the piece of communication status information about said each of the plurality of communication devices such that the piece of communication status information indicates that the particular game device is unable to perform communication; and
   communication partners list deletion programmed logic circuitry for referring to the piece of communication status information about said each of the plurality of game devices and the pieces of communication status information about the communication partners which are retained in the respective storage section of each of the plurality of game devices, and, when all pieces of communication status information indicate that a particular game device which is one of the communication partners is unable to perform communication, deleting the particular game device from a communication partners list.

2. The computer-readable storage medium of claim 1, further comprising communication partners list addition programmed logic circuitry for, when another game device is newly connected to a network, to which said each of the plurality of game devices belongs, as a new communication partner, adding the new communication partner to a communication partners list which is a listing of communication partners of said each of the plurality of game devices, the communication partners list being retained in a storage section of said each of the plurality of game devices.

3. The computer-readable storage medium according to claim 2, wherein the game program further causes the computer of each of the plurality of game devices to function as:
   a game data transmitter/receiver for transmitting and receiving the game data to and from each of the communication partners specified by the communication partners list; and
   a game processor for performing game processes in accordance with the game data received from each of the communication partners by the game data transmitter/receiver.

4. The computer-readable storage medium according to claim 3, wherein the game data transmitter/receiver regularly transmits and receives the game data.

5. The computer-readable storage medium according to claim 3, wherein the piece of communication status information about each of the plurality of game devices is transmitted to any of the communication partners by the communication status information transmitter of said each of the plurality of game devices at a same time when the game data is transmitted to said any of the communication partners by the game data transmitter/receiver of said each of the plurality of game devices.

6. The computer-readable storage medium according to claim 2, wherein the piece of communication status information about each of the plurality of game devices contains a list showing, from among the communication partners of said each of the plurality of game devices which are listed in the communication partners list, only communication partners which have been determined by the communication status determination programmed logic circuitry as being able to perform communication.

7. The computer-readable storage medium according to claim 1, wherein the communication status determination programmed logic circuitry measures an elapsed time from a last reception of a signal from each of the communication partners, and determines, based on whether or not the elapsed time has reached a predetermined period of time, whether or not a communication with said each of the communication partners is possible.

8. A game device used in a game system in which a plurality of game devices transmit and receive game data to and from each other, and each of the plurality of game devices performs game processes by using the game data received from other game devices, the game device comprising:
communication status determination programmed logic circuitry for determining, based on a reception status of a signal from each of a plurality of communication partners, the communication partners corresponding to a respective game device, whether or not a communication between said each of the plurality of game devices and each of the communication partners is possible;
first communication status information update programmed logic circuitry for, based on a determination result provided by the communication status determination programmed logic circuitry, updating as necessary a piece of communication status information about said each of the plurality of game devices which is retained in a respective storage section of each of the plurality of game devices and which shows whether or not the communication between said each of the plurality of game devices and each of the communication partners is possible;
a communication status information transmitter for regularly transmitting the piece of communication status information about said each of the plurality of game devices to the communication partners;
a communication status information receiver for receiving, from the communication partners, pieces of communication status information about the communication partners, and storing the pieces of communication status information in the respective storage section of each of the plurality of game devices;
second communication status information update programmed logic circuitry for referring to the pieces of communication status information about the communication partners received by the communication status information receiver, and, when any of the pieces of communication status information about the communication partners indicates that a particular game device which is one of the communication partners is unable to perform communication, updating the piece of communication status information about said each of the plurality of communication devices such that the piece of communication status information indicates that the particular game device is unable to perform communication; and
communication partners list deletion programmed logic circuitry for referring to the piece of communication status information about said each of the plurality of game devices and the pieces of communication status information about the communication partners which are retained in the respective storage section of each of the plurality of game devices, and, when all pieces of communication status information indicate that a particular game device which is one of the communication partners is unable to perform communication, deleting the particular game device from a communication partners list stored in the respective storage section of each of the plurality of game devices.

9. The game device of claim 8, further comprising communication partners list addition programmed logic circuitry for, when another game device is newly connected to a network, to which said each of the plurality of game devices belongs, as a new communication partner, adding the new communication partner to a communication partners list which is a listing of communication partners of said each of the plurality of game devices, the communication partners list being retained in a storage section of said each of the plurality of game devices.

10. The game device according to claim 9, further comprising:
a game data transmitter/receiver for transmitting and receiving the game data to and from each of the communication partners specified by the communication partners list; and
a game processor for performing game processes in accordance with the game data received from each of the communication partners by the game data transmitter/receiver.

11. The game device according to claim 10, wherein the game data transmitter/receiver regularly transmits and receives the game data.

12. The game device according to claim 10, wherein the piece of communication status information about each of the plurality of game devices is transmitted to any of the communication partners by the communication status information transmitter of said each of the plurality of game devices at a same time when the game data is transmitted to said any of the communication partners by the game data transmitter/receiver of said each of the plurality of game devices.

13. The game device according to claim 9, wherein the piece of communication status information about said each of the plurality of game devices contains a list showing, from among the communication partners of said each of the plurality of game devices which are listed in the communication partners list, only communication partners which have been determined by the communication status determination means as being able to perform communication.

14. The game device according to claim 8, wherein the communication status determination programmed logic circuitry measures an elapsed time from a last reception of a signal from each of the communication partners, and determines, based on whether or not the elapsed time has reached a predetermined period of time, whether or not a communication with said each of the communication partners is possible.

15. A game processing method which a plurality of game devices, which transmit and receive game data to and from each other, each execute by using the game data received from other game devices, the game processing method comprising:
determining, based on a reception status of a signal from each of the communication partners, whether or not a communication between said each of the plurality of game devices and each of a plurality communication partners, each of which corresponds to a respective game device, is possible;
based on a determination result of whether communication between each of the plurality of game devices and each of the plurality of communications partners is possible, updating as necessary a piece of communication status information about said each of the plurality of game devices which is retained in a respective storage section of each of said plurality of game devices and which shows whether or not the communication between said each of the plurality of game devices and each of the communication partners is possible;
regularly transmitting the piece of communication status information about said each of the plurality of game devices to the communication partners;

receiving, from the communication partners, pieces of communication status information about the communication partners, and storing the pieces of communication status information in the respective storage section of each of the plurality of game devices;

referring to the received pieces of communication status information about the communication partners, and, when any of the pieces of communication status information about the communication partners indicates that a particular game device which is one of the communication partners is unable to perform communication, updating the piece of communication status information about said each of the plurality of communication devices such that the piece of communication status information indicates that the particular game device is unable to perform communication; and referring to the piece of communication status information about said each of the plurality of game devices and the pieces of communication status information about the communication partners which are retained in the storage section respective storage section of each of the plurality of game devices, and, when all pieces of communication status information indicate that a particular game device which is one of the communication partners is unable to perform communication, deleting the particular game device from a communication partners list.

16. The game processing method of claim 15, further comprising, when another game device is newly connected to a network, to which each of the plurality of game devices belongs, as a new communication partner, adding the new communication partner to a communication partners list which is a listing of communication partners of said each of the plurality of game devices, the communication partners list being retained in a storage section of said each of the plurality of game devices.

17. The game processing method according to claim 16, further comprising:

transmitting and receiving the game data to and from each of the communication partners specified by the communication partners list; and performing game processes in accordance with the game data received from each of the communication partners.

18. The game processing method according to claim 17, wherein the game data is regularly transmitted and received to and from each of the communication partners specified by the communication partners list.

19. The game processing method according to claim 17, wherein the piece of communication status information about each of the plurality of game devices is transmitted to any of the communication partners at a same time when the game data is transmitted to said any of the communication partners.

20. The game processing method according to claim 15, wherein the piece of communication status information about said each of the plurality of game devices contains a list showing, from among the communication partners of said each of the plurality of game devices which are listed in the communication partners list, only communication partners which have been determined to be able to perform communication.

21. The game processing method according to claim 15, an elapsed time from a last reception of a signal from each of the communication partners is measured, and it is determined, based on whether or not the elapsed time has reached a predetermined period of time, whether or not a communication with said each of the communication partners is possible.

* * * * *